United States Patent
Shima et al.

(10) Patent No.: US 7,324,233 B2
(45) Date of Patent: Jan. 29, 2008

(54) PRINT SYSTEM AND DATA TRANSMITTING AND RECEIVING SYSTEM

(75) Inventors: Toshihiro Shima, Nagano-ken (JP); Kazuhito Gassho, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 986 days.

(21) Appl. No.: 10/464,831

(22) Filed: Jun. 17, 2003

(65) Prior Publication Data
US 2004/0054962 A1    Mar. 18, 2004

(30) Foreign Application Priority Data
Jun. 17, 2002    (JP) .............................. 2002-176185

(51) Int. Cl.
  *G06F 3/12* (2006.01)
  *G06F 15/00* (2006.01)
  *G06K 1/00* (2006.01)
(52) U.S. Cl. .................. 358/1.15; 358/1.1; 358/1.14; 358/1.16
(58) Field of Classification Search ............. 358/1.1, 358/1.14, 1.15, 1.16
See application file for complete search history.

(56) References Cited

U.S. PATENT DOCUMENTS 6,043,898 A * 3/2000 Jacobs ...................... 358/1.15
6,452,692 B1 * 9/2002 Yacoub .................... 358/1.15
6,545,767 B1 * 4/2003 Kuroyanagi ............... 358/1.14

* cited by examiner

*Primary Examiner*—Twyler Lamb
*Assistant Examiner*—Yixing Qin
(74) *Attorney, Agent, or Firm*—Martine Penilla & Gencarella, LLP

(57) ABSTRACT

A server computer acquires printer information containing printer position information from a printer and stores the printer information in a printer information table. When the printer information is request by a print client, the printer information is provided after authentication as required. The print client generates print transmitting data by adding the printer position information to print data and transmits the print transmitting data to the printer. The printer which has received the print transmitting data acquires printer position information at this point in time, and when the printer position information at this point in time coincides with the printer position information contained in the print transmitting data, the print data is printed by the printer.

26 Claims, 21 Drawing Sheets

TB10: PRINTER INFORMATION TABLE

| NETWORK ADDRESS | PRINTER MODEL INFORMATION | PRINTER POSITION | SECURITY INFORMATION | INSTALLATION LOCATION INFORMATION |
|---|---|---|---|---|
| aaa.bbb.ccc.101 | LP-7700 | X1,Y1,Z1 | WITH SECURITY | PRINT ROOM |
| aaa.bbb.ccc.102 | LP-8900 | X2,Y2,Z2 | WITH SECURITY | PRINT ROOM |
| aaa.bbb.ccc.103 | LP-7700 | X3,Y3,Z3 | WITHOUT SECURITY | ENTRANCE HALL |
| aaa.bbb.ccc.104 | LP-8900 | X4,Y4,Z4 | WITHOUT SECURITY | ENTRANCE HALL |

PRINT TRANSMITTING DATA:D10

TB20: PRINT PRINTER TABLE

| NETWORK ADDRESS (T10) | PRINTER MODEL INFORMATION (T12) | PRINTER POSITION INFORMATION (T14) |
|---|---|---|
| aaa.bbb.ccc.101 | LP-7700 | X1,Y1,Z1 |
| ⋮ | ⋮ | ⋮ |

FIG.11

TB30: USER AUTHENTICATION INFORMATION TABLE

| T20 USER ID | T22 PASSWORD |
|---|---|
| ABC1234567 | password1 |
| ⋮ | ⋮ |

FIG.13

TB100: PRINTER INFORMATION TABLE

| NETWORK ADDRESS | PRINTER MODEL INFORMATION | PUBLIC KEY | SECURITY INFORMATION | INSTALLATION LOCATION INFORMATION |
|---|---|---|---|---|
| aaa.bbb.ccc.101 | LP-7700 | PKEY1 | WITH SECURITY | PRINT ROOM |
| aaa.bbb.ccc.102 | LP-8900 | PKEY2 | WITH SECURITY | PRINT ROOM |
| aaa.bbb.ccc.103 | LP-7700 | PKEY3 | WITHOUT SECURITY | ENTRANCE HALL |
| aaa.bbb.ccc.104 | LP-8900 | PKEY4 | WITHOUT SECURITY | ENTRANCE HALL |

FIG.16

TB110: PRINT PRINTER TABLE

| NETWORK ADDRESS (T10) | PRINTER MODEL INFORMATION (T12) | PUBLIC KEY (T100) |
|---|---|---|
| aaa.bbb.ccc.101 | LP-7700 | PKEY1 |
| ⋮ | ⋮ | ⋮ |

FIG.18

PRINT SYSTEM AND DATA TRANSMITTING AND RECEIVING SYSTEM

BACKGROUND OF THE INVENTION

1. Field of the Invention

The present invention relates to a print system and a data transmitting and receiving system, and particularly relates to a print system including a server computer to manage a printer which ensures security of data to be printed and a data transmitting and receiving system including a server computer to manage a data receiving device which ensures security of data to be processed.

2. Description of the Related Art

These days, a print system in which a printer is shared by means of a network has been increasingly used. Namely, by connecting plural computers as print clients to one network and connecting, for example, one printer to this network, one printer can accept print data from the plural print clients and prints the print data.

In such a print system by means of the network, various users can transmit print data from their respective print clients to the printer and perform printing.

However, if the print data transmitted from the print clients is printed by the printer unconditionally, a print operation is executed even by the printer which is not installed in a place where the user intends to perform printing. In particular, in the case of a printer which is moved from one place where the printer has been heretofore used to another place, an IP address or the like which is an address on the network sometimes remains unchanged, and hence the transmitted print data may be printed by the printer moved to another place. The above situation is undesirable for users who want to ensure the security of print data.

Moreover, if the print data transmitted from the print clients is printed by the printer unconditionally, even print data transmitted from the print clients which are not duly authorized to perform printing with the printer is printed by the printer. In this case, print clients capable of perform printing with the printer cannot be restricted, which is undesirable as well. Especially when the possibility of the existence of users who transmit a large amount of print data with dishonest intention is considered, it is necessary to provide some print restriction.

Further, in some cases, a printer which has been used in one department of a company is moved to another department and used there. In such a case, even print clients who have heretofore had the authority of perform printing with this printer are not sometimes wanted to be given the authority to perform printing with this printer after the printer has been moved. In the above situation, a need for technology which prevents print data from the print clients from being printed on the printer side is acknowledged.

Hence, the present invention is made in view of the aforementioned problem, and an object of the present invention is to provide a print system, which ensures security of print data and a printer, by restricting printable print data based on information on a position where the printer is installed. Another object of the present invention is to increase user-friendliness by properly providing printer position depending information dependent on a printer position which specifies a position where the printer is installed to a user of a print client.

Moreover, still another object of the present invention is to provide a data transmitting and receiving system, which ensures security of process data and a data receiving device, by restricting processable process data based on information on a position where the data receiving device is installed. Yet another object of the present invention is to increase user-friendliness by properly providing data receiving device position depending information dependent on a data receiving device position which specifies a position where the data receiving device is installed to a user of a data transmitting device.

SUMMARY OF THE INVENTION

In order to accomplish the aforementioned and other objects, according to one aspect of the present invention, a print system print system includes one or more than one printer and a server computer to manage the printer, wherein the printer comprises:

a printer position acquisition which acquires a printer position to specify a position where the printer is installed;

a printer information generator which generates printer position depending information dependent on the printer position acquired by the printer position acquisition; and a first printer information provider which provides the printer position depending information generated by the printer information generator to the server computer, the server computer comprises:

a printer information storage which stores the printer position depending information provided from the printer; and a second printer information provider which provides the printer position depending information stored in the printer information storage to a print client in response to a request from the print client, and the printer further comprises:

a print transmitting data receiver which receives print transmitting data transmitted from the print client;

a judgment section which judges whether the print transmitting data received by the print transmitting data receiver matches a printer position acquired from the printer position acquisition at a point in time when the print transmitting data is received; and a print restriction which executes a print operation based on the print transmitting data when the judgment section judges that the print transmitting data matches the printer position and restricts the print operation based on the print transmitting data when the judgment section judges that the print transmitting data does not match the printer position.

According to another aspect of the present invention, a method of controlling a print system including one or more than one printer and a server computer to manage the printer, comprises the steps of:

acquiring a printer position to specify a position where the printer is installed from a printer position acquisition;

generating printer position depending information dependent on the printer position acquired from the printer position acquisition;

providing the printer position depending information from the printer to the server computer;

storing the printer position depending information provided from the printer in a printer information storage in the server computer;

providing the printer position depending information stored in the printer information storage to a print client in response to a request from the print client;

receiving print transmitting data transmitted from the print client in the printer;

judging whether the received print transmitting data matches a printer position acquired from the printer position acquisition at a point in time when the print transmitting data is received;

executing a print operation based on the print transmitting data when it is judged that the print transmitting data matches the printer position; and restricting the print operation based on the print transmitting data when it is judged that the print transmitting data does not match the printer position.

According to another aspect of the present invention, a server computer to manage one or more than one printer, the printer receiving print transmitting data transmitted from a print client, acquiring a printer position to specify a position where the printer is installed, executing a print operation based on the print transmitting data when it is judged that the print transmitting data matches the printer position, and restricting the print operation based on the print transmitting data when it is judged that the print transmitting data does not match the printer position, the server computer, comprises:

a printer information acquisition which acquires printer position depending information dependent on the printer position where the printer is installed from the printer;

a printer information storage which stores the printer position depending information acquired by the printer information acquisition; and a printer information provider which provides the printer position depending information stored in the printer information storage to the print client in response to a request from the print client.

According to another aspect of the present invention, a method of controlling a server computer to manage one or more than one printer, the printer receiving print transmitting data transmitted from a print client, acquiring a printer position to specify a position where the printer is installed, executing a print operation based on the print transmitting data when it is judged that the print transmitting data matches the printer position, and restricting the print operation based on the print transmitting data when it is judged that the print transmitting data does not match the printer position, the method of controlling the server computer, comprises the steps of:

acquiring printer position depending information dependent on the printer position where the printer is installed from the printer;

storing the acquired printer position depending information in a printer information storage; and providing the printer position depending information stored in the printer information storage to the print client in response to a request from the print client.

According to another aspect of the present invention, a printer capable of connecting with a server computer for management, comprises:

a printer position acquisition which acquires a printer position to specify a position where the printer is installed;

a printer information generator which generates printer position depending information dependent on the printer position acquired by the printer position acquisition;

a first printer information provider which provides the printer position depending information generated by the printer information generator to the server computer;

a print transmitting data receiver which receives print transmitting data transmitted from a print client;

a judgment section which judges whether the print transmitting data received by the print transmitting data receiver matches a printer position acquired from the printer position acquisition at a point in time when the print transmitting data is received; and a print restriction which executes a print operation based on the print transmitting data when the judgment section judges that the print transmitting data matches the printer position and restricts the print operation based on the print transmitting data when the judgment section judges that the print transmitting data does not match the printer position.

According to another aspect of the present invention, a method of controlling a printer capable of connecting with a server computer for management, comprises the steps of:

acquiring a printer position to specify a position where the printer is installed;

generating printer position depending information dependent on the acquired printer position;

providing the generated printer position depending information to the server computer;

receiving print transmitting data transmitted from a print client;

judging whether the received print transmitting data matches a printer position acquired at a point in time when the print transmitting data is received;

executing a print operation based on the print transmitting data when it is judged that the print transmitting data matches the printer position; and restricting the print operation based on the print transmitting data when it is judged that the print transmitting data does not match the printer position.

According to another aspect of the present invention, a print client capable of connecting with one or more than one printer and a server computer to manage the printer, comprises:

a printer position depending information acquisition which acquires printer position depending information dependant on a printer position where the printer is installed from the server computer;

a print data generator which generates print data to allow the printer to execute a print operation;

a print transmitting data generator which generates print transmitting data with at least the print data generated by the print data generator and the printer position depending information acquired by the printer position depending information acquisition; and a print transmitting data transmitter which transmits the print transmitting data generated by the print transmitting data generator to the printer.

According to another aspect of the present invention, a method of controlling a print client capable of connecting with one or more than one printer and a server computer to manage the printer, comprises the steps of:

acquiring printer position depending information dependant on a printer position where the printer is installed from the server computer;

generating print data to allow the printer to execute a print operation;

generating print transmitting data with at least the print data and the printer position depending information; and transmitting the print transmitting data to the printer.

According to another aspect of the present invention, a print system includes one or more than one printer and a server computer to manage the printer, wherein the printer comprises:

a printer position acquisition which acquires a printer position to specify a position where the printer is installed;

a public key generator which generates a public key with a first passphrase containing at least the printer position acquired by the printer position acquisition; and a first public key information provider which provides the public key generated by the public key generator to the server computer, the server computer comprises:

a public key storage which stores the public key provided from the printer; and a second public key information provider which provides the public key stored in the public key storage to a print client in response to a request from the print client, and the printer further comprises;

a print transmitting data receiver which receives print transmitting data transmitted from the print client;

a private key generator which generates a private key with a second passphrase containing at least a printer position acquired from the printer position acquisition at a point in time when the print transmitting data is received; and a print executor which decrypts the print transmitting data received by the print transmitting data receiver with the private key and executes a print operation based on print data obtained by the decryption.

According to another aspect of the present invention, a method of controlling a print system including one or more than one printer and a server computer to manage the printer, comprises the steps of:

acquiring a printer position to specify a position where the printer is installed from a printer position acquisition;

generating a public key with a first passphrase containing at least the printer position acquired from the printer position acquisition;

providing the generated public key from the printer to the server computer, storing the public key provided from the printer in a public key storage of the server computer;

providing the public key stored in the public key storage to a print client in response to a request from the print client;

receiving print transmitting data transmitted from the print client in the printer;

generating a private key with a second passphrase containing at least a printer position acquired from the printer position acquisition at a point in time when the print transmitting data is received; and decrypting the received print transmitting data with the private key and executes a print operation based on print data obtained by the decryption.

According to another aspect of the present invention, a data transmitting and receiving system includes one or more than one data receiving device and a server computer to manage the data receiving device, wherein the data receiving device comprises:

a data receiving device position acquisition which acquires a data receiving device position to specify a position where the data receiving device is installed;

a data receiving device information generator which generates data receiving device position depending information dependent on the data receiving device position acquired by the data receiving device position acquisition; and a first data receiving device information provider which provides the data receiving device position depending information generated by the data receiving device information generator to the server computer, the server computer comprises:

a data receiving device information storage which stores the data receiving device position depending information provided from the data receiving device; and a second data receiving device information provider which provides the data receiving device position depending information stored in the data receiving device information storage to a data transmitting device in response to a request from the data transmitting device, and the data receiving device further comprises;

a transmitting data receiver which receives transmitting data transmitted from the data transmitting device;

a judgment section which judges whether the transmitting data received by the transmitting data receiver matches a data receiving device position acquired from the data receiving device position acquisition at a point in time when the transmitting data is received; and a process restriction which executes a process based on the transmitting data when the judgment section judges that the transmitting data matches the data receiving device position and restricts the process based on the transmitting data when the judgment section judges that the transmitting data does not match the data receiving device position.

According to another aspect of the present invention, a server computer to manage one or more than one data receiving device, the data receiving device receiving transmitting data transmitted from a data transmitting device, acquiring a data receiving device position to specify a position where the data receiving device is installed, executing a process based on the transmitting data when it is judged that the transmitting data matches the data receiving device position, and restricting the process based on the transmitting data when it is judged that the transmitting data does not match the data receiving device position, the server computer, comprises:

a data receiving device information acquisition which acquires data receiving device position depending information dependent on the data receiving device position where the data receiving device is installed from the data receiving device;

a data receiving device information storage which stores the data receiving device position depending information acquired by the data receiving device information acquisition; and a data receiving device information provider which provides the data receiving device position depending information stored in the data receiving device information storage to the data transmitting device in response to a request from the data transmitting device.

According to another aspect of the present invention, a data receiving device capable of connecting with a server computer for management, comprises:

a data receiving device position acquisition which acquires a data receiving device position to specify a position where the data receiving device is installed;

a data receiving device information generator which generates data receiving device position depending information dependent on the data receiving device position acquired by the data receiving device position acquisition;

a first data receiving device information provider which provides the data receiving device position depending information generated by the data receiving device information generator to the server computer;

a transmitting data receiver which receives transmitting data transmitted from a data transmitting device;

a judgment section which judges whether the transmitting data received by the transmitting data receiver matches a data receiving device position acquired from the data receiving device position acquisition at a point in time when the transmitting data is received; and a process restriction which executes a process based on the transmitting data when the judgment section judges that the transmitting data matches the data receiving device position and restricts the process based on the transmitting data when the judgment section judges that the transmitting data does not match the data receiving device position.

According to another aspect of the present invention, a data transmitting device capable of connecting with one or more than one data receiving device and a server computer to manage the data receiving device, comprises:

a data receiving device position depending information acquisition which acquires data receiving device position depending information dependant on a data receiving device position where the data receiving device is installed from the server computer;

a process data generator which generates process data to allow the data receiving device to execute a process;

a transmitting data generator which generates transmitting data with at least the process data generated by the process data generator and the data receiving device position depending information acquired by the data receiving device position depending information acquisition; and a transmitting data transmitter which transmits the transmitting data generated by the transmitting data generator to the data receiving device.

BRIEF DESCRIPTION OF THE DRAWINGS

FIG. 5 is a diagram showing an example of the structure of a printer information table held by the server computer according to the first embodiment of the present invention;

FIG. 11 is a diagram showing an example of the structure of a print printer table held by the print client according to the first embodiment of the present invention;

FIG. 13 is a diagram showing an example of a user authentication information table held by the server computer according to the first embodiment and the second embodiment of the present invention;

FIG. 16 is a diagram showing an example of the structure of a printer information table held by the server computer according to the second embodiment of the present invention;

FIG. 18 is a diagram showing the structure of a print printer table held by the print client according to the second embodiment of the present invention;

DETAILED DESCRIPTION OF THE EMBODIMENTS

First Embodiment

A print system according to the first embodiment of the present invention is designed in such a manner that at least printer position information indicating a position where a printer is installed is previously registered with a printer database of a server computer and the printer position information can be acquired from the server computer when a user of a print client wants to acquire the printer position information. Hence, the user can easily acquire printer position information on a printer which he or she wants to use for a print operation. Further details will be given below.

Figure 1:
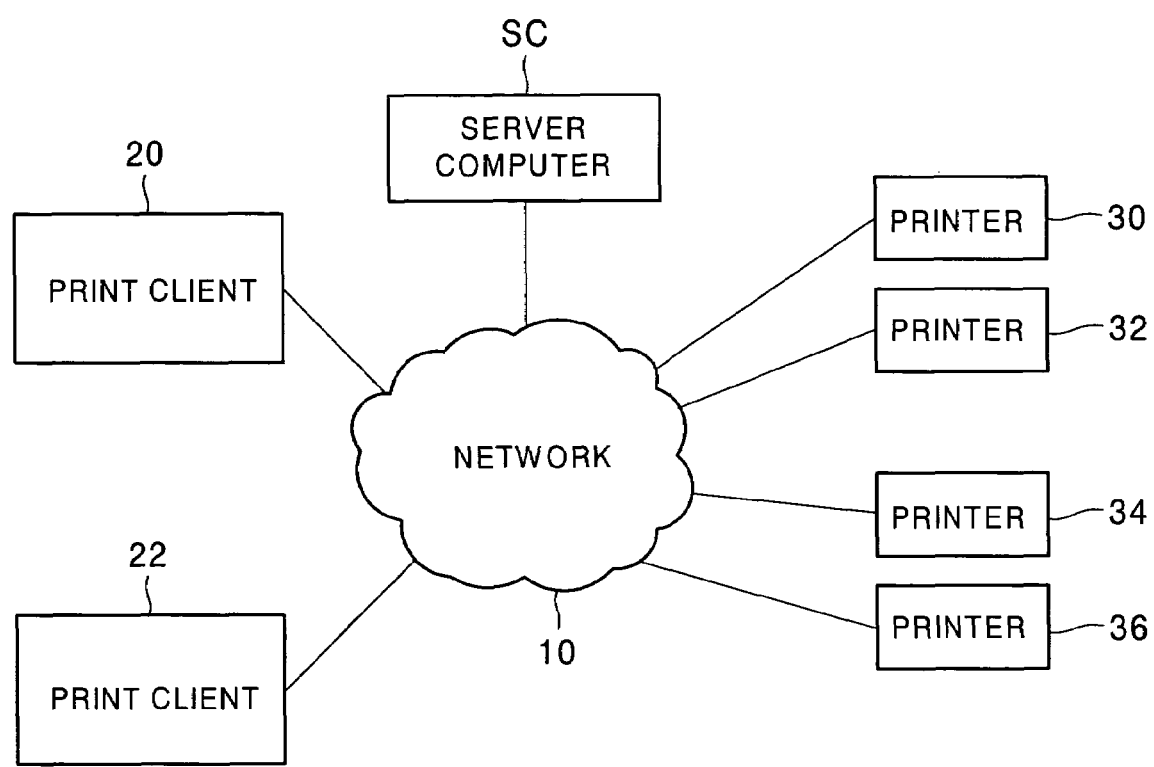
FIG. 1 is a diagram showing an example of the configuration of a print system according to each of embodiments of the present invention.

First, the configuration of the print system according to this embodiment will be explained based on FIG. 1. FIG. 1 is a block diagram showing the hardware configuration of the print system according to this embodiment.

As shown in FIG. 1, the print system according to this embodiment includes print clients 20 and 22 connected to a network 10, printers 30, 32, 34, and 36 and a server computer SC which are also connected to the network 10. In this embodiment, the network 10 is constituted by the Internet using TCP/IP (transmission control protocol/internet protocol). However, the form of the network 10 is not limited to the Internet, and, for example, it may be constituted by a LAN such as Ethernet (registered trademark).

The print clients 20 and 22 are each composed of any of various kinds of computers, for example, called a host computer and a personal computer. In this embodiment, in particular, the print clients 20 and 22 generate print transmitting data containing print data and transmit this print transmitting data to any one of the printers 30 through 36 via the network 10. The number of print clients connected to the network 10 is optional, and it may be one or more than one.

Moreover, the print client is not limited to a computer, and, for example, it may be a digital camera with a necessity to print a taken image, a content server in which print image data is stored as contents or the like.

Further, in this embodiment, the printers 30 through 36 are so-called network printers. In this embodiment, particularly the printers 30 through 36 receive print transmitting data from the print client 20 and/or the print client 22 and print data contained in the print transmitting data only when printer position information contained in the print transmitting data and position information at the present time coincide.

In this embodiment, the printers 30 through 36 are directly connected to the network 10, and each of the printers 30 through 36 has its own peculiar network address. Accordingly, the print clients 20 and 22 can transmit print transmitting data to any of the printers 30 through 36 by designating its network address.

Furthermore, in this embodiment, the printers 30 and 32 are installed in a room where security is ensured, for example, in a print room into/out of which only authorized persons can go. Hence, only the authorized persons can acquire and look at printed matter printed by the printers 30 and 32. Moreover, users authorized to perform printing with the printers 30 and 32 are restricted.

On the other hand, the printers 34 and 36 are installed in a room where security is not ensured, for example, in an entrance hall into/out of which anybody can go freely. Hence, there is a possibility that anyone can look at printed matter printed by the printers 34 and 36. Moreover, users authorized to perform printing with the printers 34 and 36 are not restricted.

Incidentally, the printers 30 through 36 are directly connected to the network 10 in FIG. 1, but the printers 30 through 36 may be connected thereto via a printer server. Moreover, the number of printers connected to the network 10 is optional, and it may be one or more than one.

The server computer SC is a computer which manages the printers 30 through 36. Although further details will be given later, particularly in this embodiment, the server computer SC holds and manages at least network addresses, printer model information, printer position information, security information, and installation location information on the printers 30 through 36 on a printer-by-printer basis.

Figure 2:
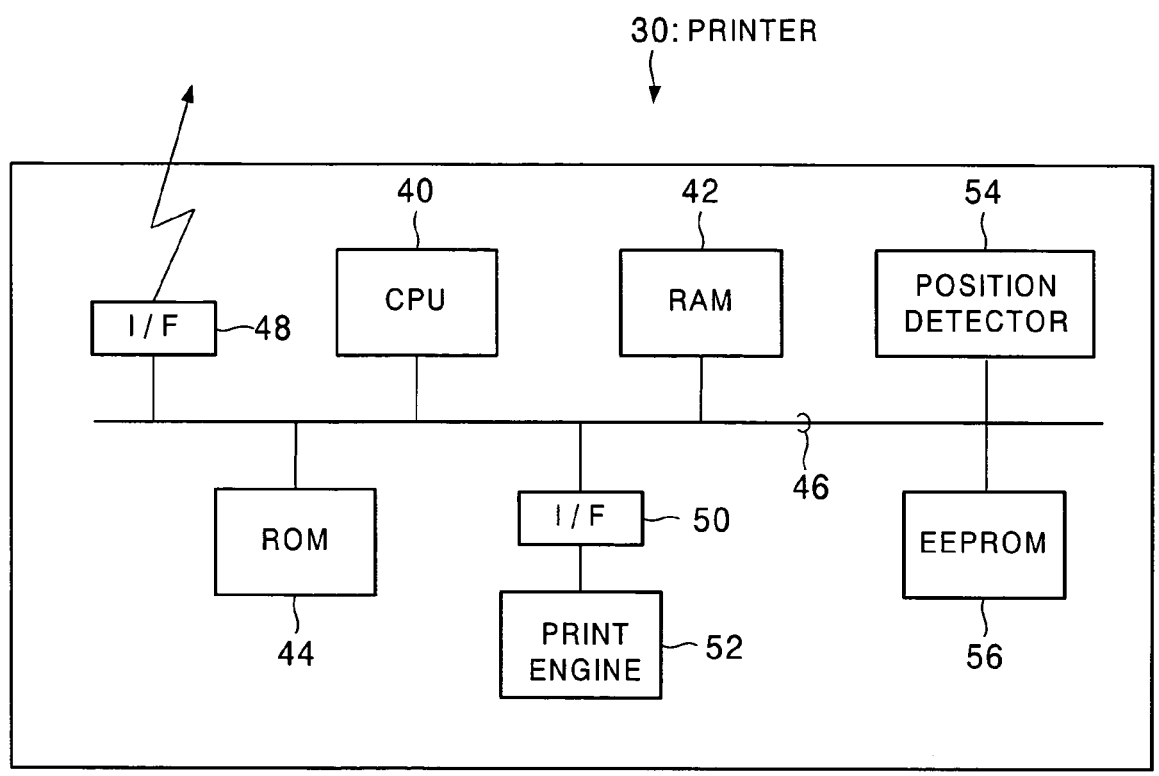
FIG. 2A is a diagram showing an example of the hardware configuration of a printer according to each of the embodiments of the present invention.
FIG. 2B is a diagram showing a modification of the hardware configuration of the printer.
Figure 2:
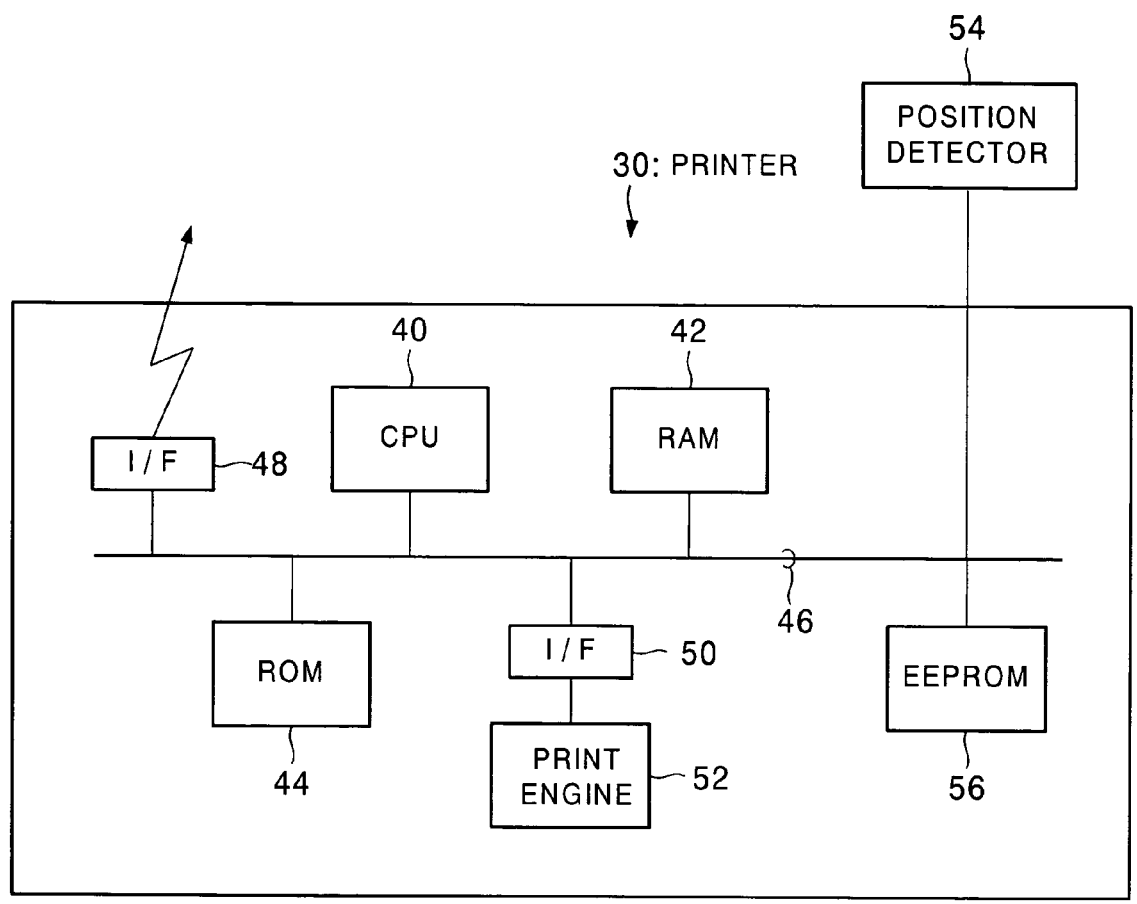

FIG. 2A is a block diagram explaining the internal configuration of the printer 30. It should be mentioned that the internal configurations of the printers 32 through 36 are the same as that of the printer 30.

As shown in FIG. 2A, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, it is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude, respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30. Alternatively, the position of the printer 30 may be specified by using mobile communication technology including the PHS (Personal Handyphone System).

Further, it is also possible that the position detector 54 includes both a GPS function and a PHS function and normally detects an installation position by the GPS, but when it cannot detect the position by the GPS due to radio wave conditions, it may detect the position by the PHS.

Furthermore, the printer 30 according to this embodiment includes an EEPROM (Electrically Erasable Programmable ROM) 56, which is connected to the internal bus 46, as a nonvolatile semiconductor memory device. Information stored in this EEPROM 56 is held even when the printer 30 is powered off.

Additionally, the position detector 54 is contained in the printer 30 in FIG. 2A, but the position detector 54 may be provided outside the printer 30 as shown in FIG. 2B. For example, it is possible that when the necessity arises, a cellular phone equipped with the GPS is connected to the printer 30, and thereby the printer 30 has a position detection function.

Figure 3:
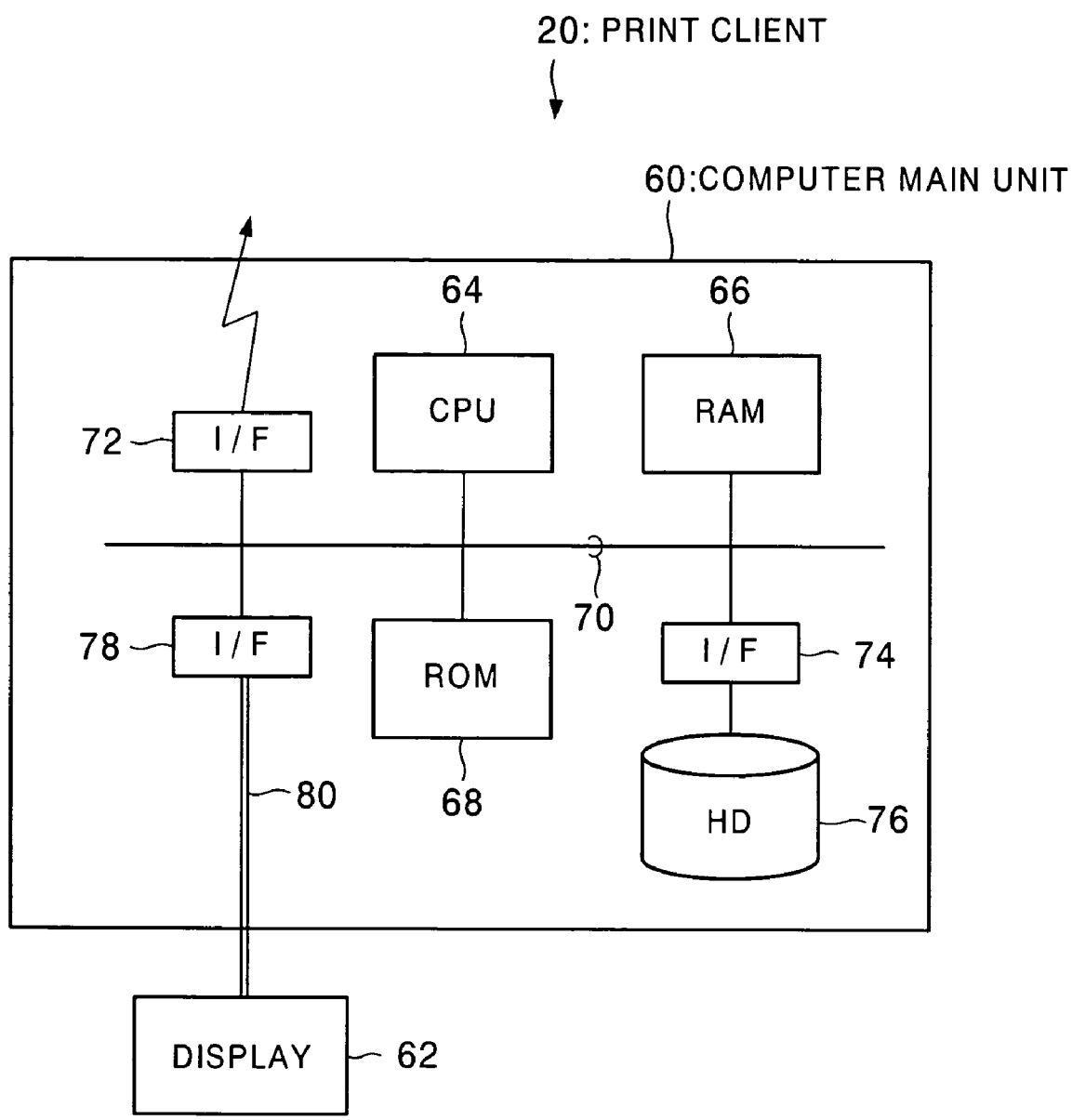
FIG. 3 is diagram showing an example of the hardware configuration of a print client according to each of the embodiments of the present invention.

FIG. 3 is a block diagram explaining the internal configuration of the print client 20. It should be mentioned that the internal configuration of the print client 22 is the same as that of the print client 20 in this embodiment.

As shown in FIG. 3, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 72, and the print client 20 is connected to the aforementioned network 10 via the communication interface 72.

In addition, an interface 74 is connected to the internal bus 70, and a hard disk 76 which is a large capacity storage is connected to the interface 74. Moreover, an interface 78 is connected to the internal bus 70, and the aforementioned display 62 is connected via a cable 80 which extends from the interface 78.

Figure 4:
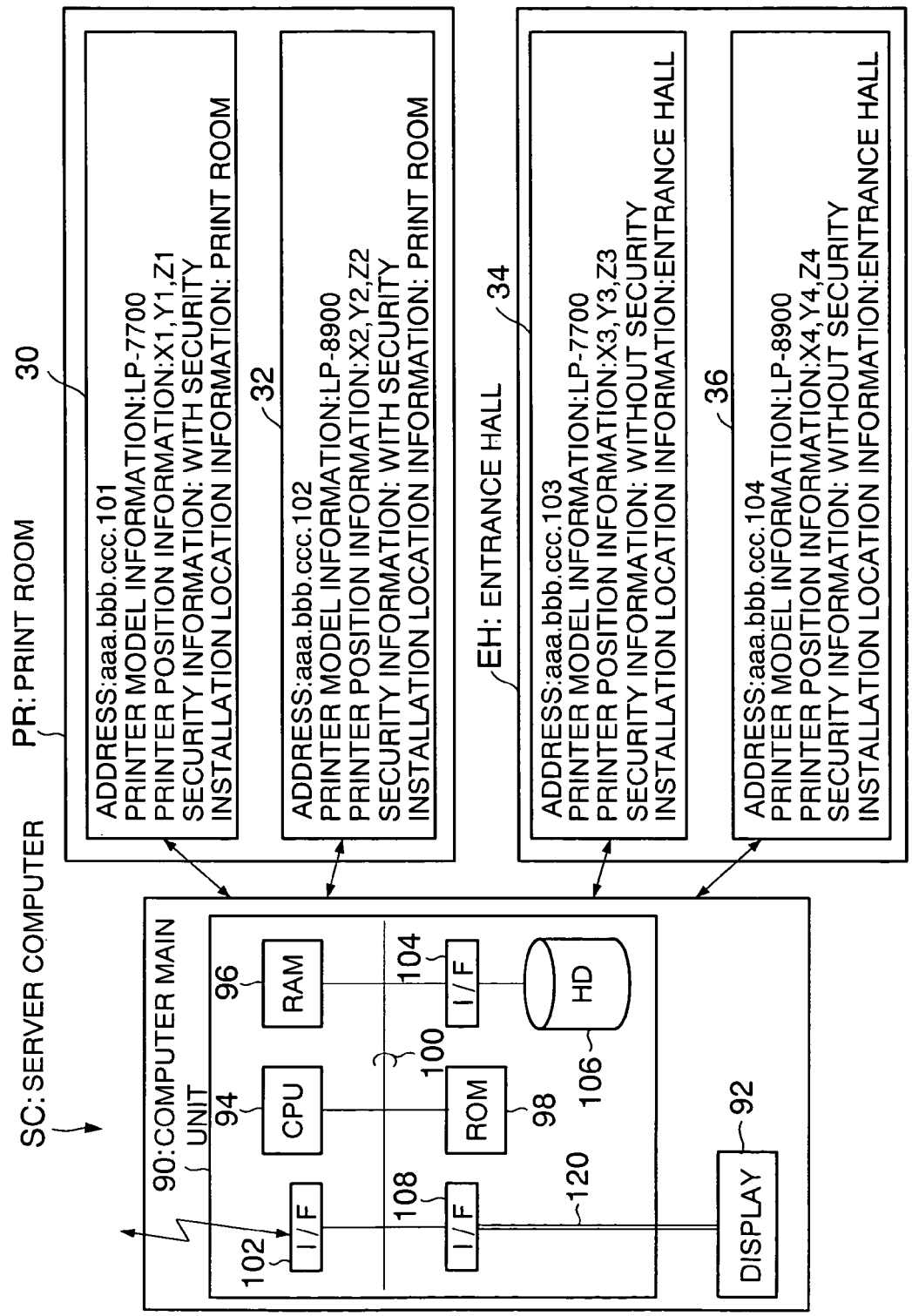
FIG. 4 is a diagram showing an example of the hardware configuration of a server computer according to each of the embodiments of the present invention.

FIG. 4 is a block diagram explaining the internal configuration of the server computer SC. As shown in FIG. 4, the server computer SC according to this embodiment includes a computer main unit 90 and a display 92.

The computer main unit 90 includes a CPU 94, a RAM 96, and a ROM 98, and they are connected to each other via an internal bus 100. A communication interface 102 is connected to the internal bus 100, and the server computer SC is connected to the aforementioned network 10 via the communication interface 102.

In addition, an interface 104 is connected to the internal bus 100, and a hard disk 106 which is a large capacity storage is connected to the interface 104. Moreover, an interface 108 is connected to the internal bus 100, and the aforementioned display 92 is connected via a cable 120 which extends from the interface 108.

A database which stores printer information on the aforementioned printers 30 through 36 is formed in the hard disk 106 of the server computer SC. FIG. 5 is diagram showing the structure of a printer information table TB10 formed as the database in the hard disk 106.

As shown in FIG. 5, the printer information table TB10 includes, as data items, a network address T10, printer model information T12, printer position information T14, security information T16, and installation location information T18. In the network address T10, network addresses of respective printers managed by the server computer SC are stored. In the printer model information T12, information specifying models of the respective printers is stored. In the printer position information T14, printer position information indicating positions where the respective printers are installed is stored. In the security information T16, information indicating the presence or absence of security of the respective printers is stored. In the installation location information T18, names specifying locations where the respective printers are installed are stored.

In this embodiment, data stored in the respective data items T10 through T18 is transmitted from the respective printers to the server computer SC via the network 10. Namely, as shown in FIG. 4 and FIG. 5, in this embodiment, the printers 30 and 32 are installed in a print room PR where security is ensured, and the printers 34 and 36 are installed in an entrance hall EH where security is not ensured. Out of the print information on the respective printers 30 through 36, the network addresses, the printer model information, the security information, and the installation location information are previously registered with the printers themselves by managers of the respective printers. Namely, the printer managers each register the network address, the printer model information, the security information, and the installation location information in advance with the irrespective printers. This information registered by the printer managers is stored, for example, in the EEPROM 56 and held in a nonvolatile manner. It is needless to say that a place where the information registered by the printer managers is stored is not limited to the EEPROM 56. Moreover, the printer position information is acquired from the position detector 54.

The printers 30 through 36 transmit their own printer information to the server computer SC in predetermined timing, and the server computer SC stores the received printer information in the printer information table TB10. In the example of the printer information table TB10 shown in FIG. 5, the printer information on the printers 30, 32, 34, and 36 is stored in order from the top.

Next, a brief explanation of a process, for example, when a user of the print client 20 performs printing with the printer 30 in the print system according to this embodiment will be given.

In this case, the user of the print client 20 acquires the printer information on the printer 30, which he or she intends to use for a print operation, from the server computer SC. It is assumed here that the user of the print client 20 acquires the network address, printer position information, printer model information on the printer 30. However, since the printer 30 is a printer with security, the sever computer SC requests authentication information from the print client 20, and provides the printer information on the printer 30 to the print client 20 only in the case of a coincidence of the authentication information.

Figure 6:
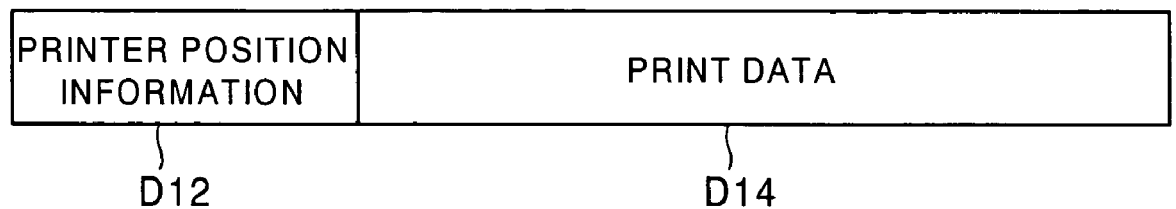
FIG. 6 is a diagram showing an example of a format of print transmitting data transmitted from the print client to the printer in the first embodiment of the present invention.

Subsequently, the user of the print client 20 generates data to be printed and designates the printer 30 for the print client 20 to execute a print operation. FIG. 6 is a diagram explaining a data format of print transmitting data D10 generated by the print client 20 on this occasion.

As shown in FIG. 6, the print client 20 generates the print transmitting data D10 by adding acquired printer position information D12 to print data D14. Here, the print data D14 means original print data needed for a print operation executed by driving the print engine 52 in the printer 30. Incidentally, the print transmitting data D10 may contain data other than the printer position information D12 and the print data D14 shown in FIG. 6.

The print client 20 encrypts all the print transmitting data D10 in this embodiment, but the print client 20 need not necessarily encrypt the print transmitting data D10. The print client 20 then transmits the print transmitting data D10 to the printer 30 via the network 10.

The printer 30 which has received the print transmitting data D10 temporarily stores the received print transmitting data D10 in the RAM 42 as shown in FIG. 2A or FIG. 2B. The printer 30 then decrypts the encrypted print transmitting data D10 and acquires the printer position information D12 contained in the print transmitting data D10. Moreover, the printer 30 acquires printer position information on the printer 30 at this point in time from the print detector 54. Subsequently, the printer 30 judges whether the printer position information D12 contained in the print transmitting data D10 and the printer position information at this point in time coincide. When both the printer position information D12 and the printer position information at this point in time coincide, the print data D14 contained in the print transmitting data D10 is transmitted to the print engine 52 and printed, and when the printer position information D12 and the printer position information at this point in time do not coincide, the print data D14 is not printed.

Next, processes executed by the printers 30 through 36, the sever computer SC, and the print clients 20 and 22 in order to realize the aforementioned process will be explained in detail. First, processes executed by the printers 30 through 36 and the server computer SC when the printer information is registered with the server computer SC will be explained in detail.

Figure 7:
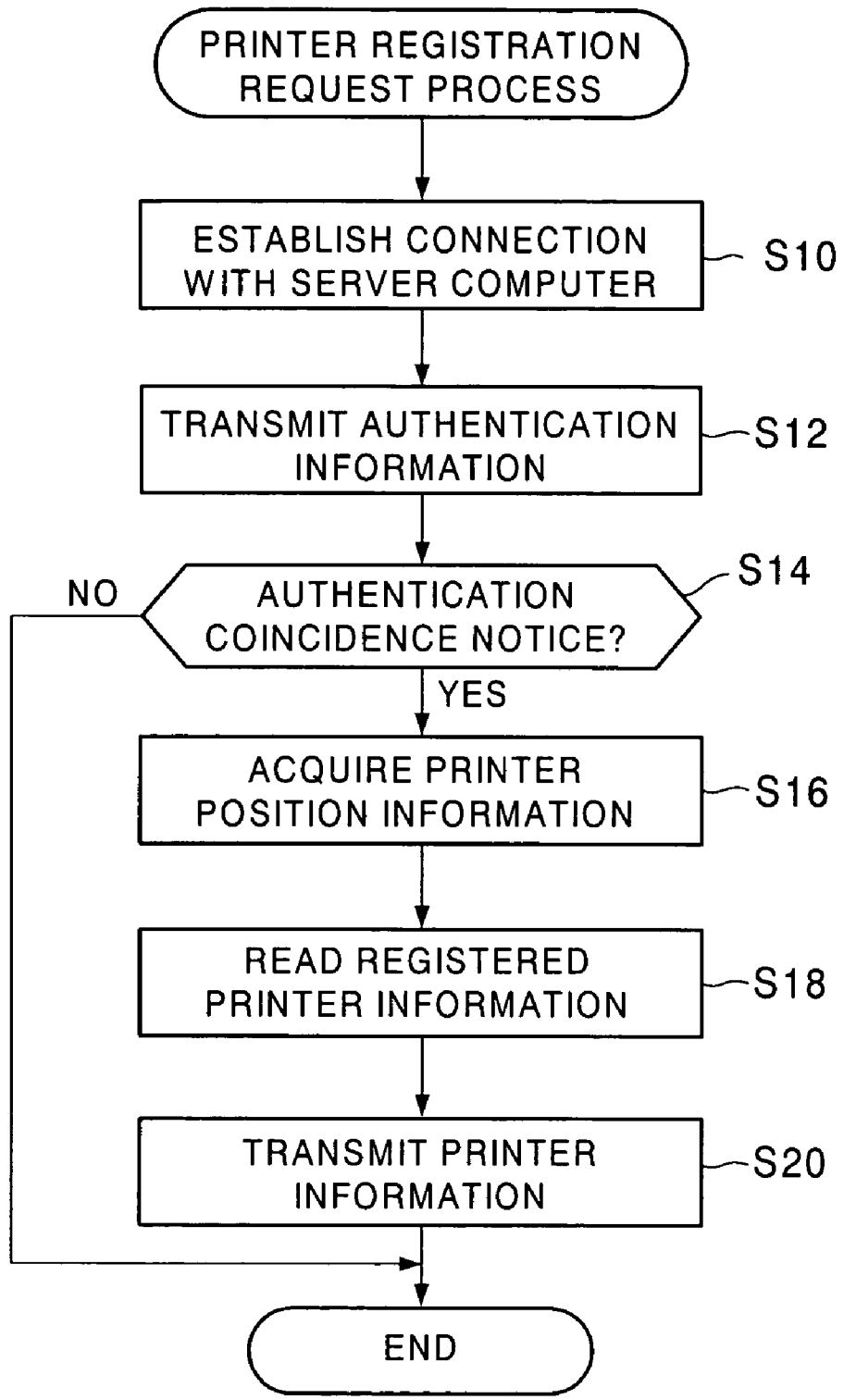
FIG. 7 is a flowchart explaining a printer registration request process executed by the printer according to the first embodiment of the present invention.

FIG. 7 is a flowchart explaining a printer registration request process executed by the printers 30 through 36. This printer registration request process is realized by making the CPU40 read and execute a printer registration request program stored in the ROM 44 of each of the printers 30 through 36. Additionally, this printer registration request process is automatically started, for example, when the printers 30 through 36 are powered on. However, even after power-on, the printers 30 through 36 may automatically execute the printer registration request process at predetermined intervals (for example, once a day). Incidentally, assuming here a case where printer information is transmitted from the printer 30 to the server computer SC and registered therewith, the following explanation is given.

As shown in FIG. 7, in the printer registration request process, first, the printer 30 connects with the server computer SC (step S10). In this embodiment, the printer 30 ensures secrecy by SSL (secure socket layer) communication and establishes a connection with the server computer SC.

Thereafter, the printer 30 transmits authentication information to the server computer SC (step S12). In this embodiment, a printer ID and a password to identify the printer are transmitted to the server computer SC. Then, the printer 30 receives an authentication result thereof from the server computer SC and judges whether the authentication result is an authentication coincidence notice (step S14).

When the authentication result is the authentication coincidence notice (step S14: Yes), the printer 30 acquires printer position information from the position detector 54 (step S16). This printer position information constitutes printer position depending information dependent on a printer position in this embodiment.

Subsequently, the printer 30 acquires printer information, for example, stored in the EEPROM 56 (step S18). Namely, the printer 30 acquires its own network address, printer model information, security information, and installation location information. Then, the printer 30 transmits these printer position information, network address, printer model information, security information, and installation position information as the printer information to the server computer SC (step S20). Thus, the printer process request process according to this embodiment is completed.

On the other hand, when it is judged in step S14 that the received authentication result is not the authentication coincidence notice (step S14: No), that is, when it is judged that the received authentication result is an authentication non-coincidence notice, the printer registration request process is completed without the printer information being transmitted.

Figure 8:
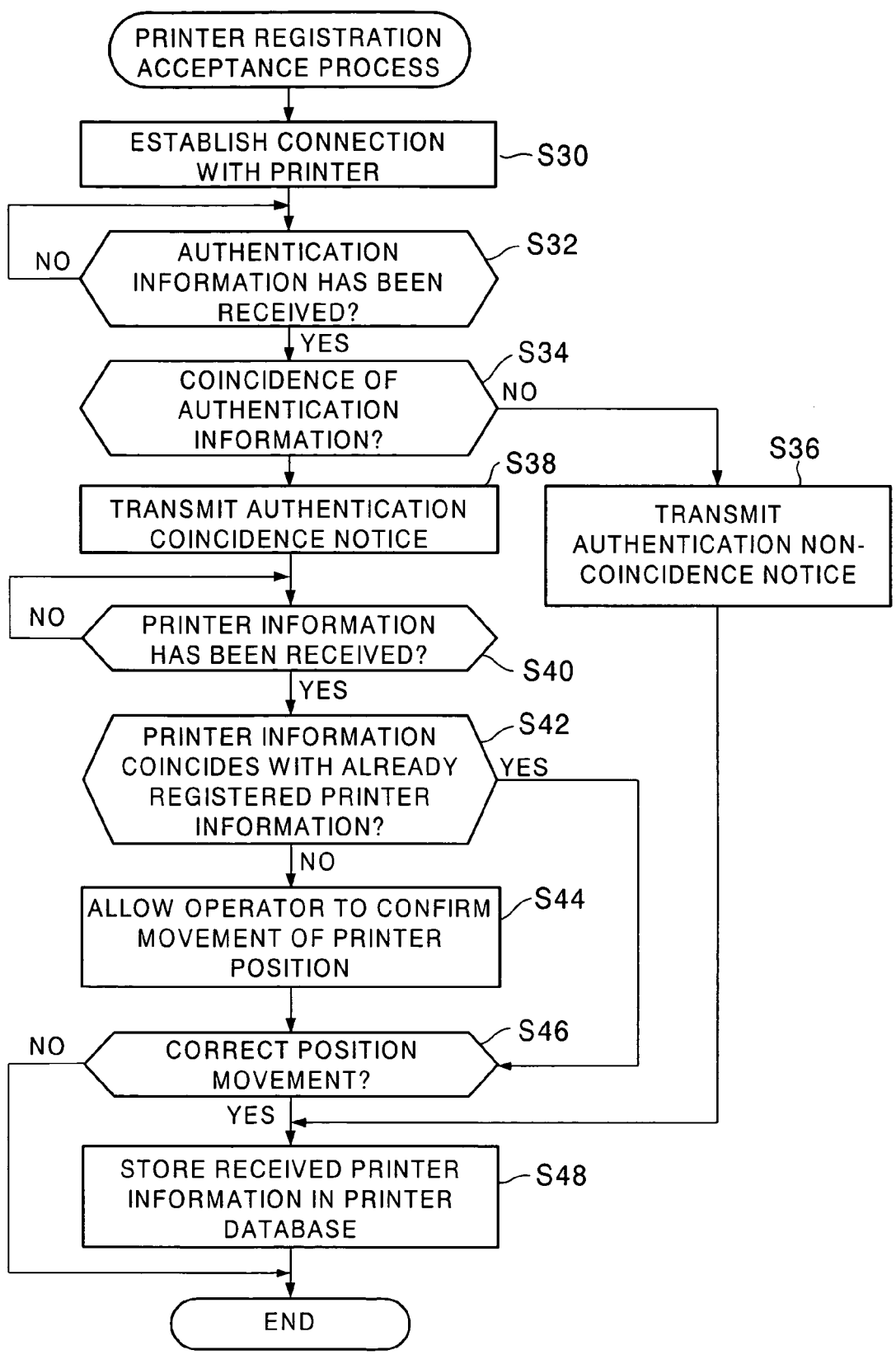
FIG. 8 is a flowchart explaining a printer registration acceptance process executed by the server computer according to the first embodiment and the second embodiment of the present invention.

Next, a printer registration acceptance process executed by the server computer SC corresponding to the printer registration request in the printers 30 through 36 will be explained based on FIG. 8. FIG. 8 is a flowchart explaining the printer registration acceptance process executed by the server computer SC. This printer registration acceptance process is realized by making the CPU 94 read and execute a printer registration acceptance program stored in the ROM 98 or the hard disk 106 of the server computer SC. Also here, similarly to the above, assuming the case where the printer information on the printer 30 is registered with the server computer SC, the following explanation is given.

As shown in FIG. 8, first, the sever computer SC establishes a connection with the printer 30 (step S30). This corresponds to the aforementioned step S10 on the printer 30 side. Namely, the server computer SC and the printer 30 are connected by SSL communication which ensures secrecy.

Thereafter, the server computer SC judges whether the authentication information has been received from the printer 30 (step S32). When the authentication information has not been received (step S32: No), the server computer SC stands by while repeating the process in step S32.

On the other hand, when the authentication information has been received from the printer 30 (step S32: Yes), whether this authentication information coincides with authentication information which is previously registered with the server computer SC is judged (step S34). Specifically, since the printer ID and the password are transmitted as the authentication information from the printer 30 as described above, whether these printer ID and password coincide with a printer ID and a password which are previously registered with the server computer SC is judged.

When both pieces of authentication information do not coincide (step S34: No), the server computer SC transmits the authentication non-coincidence notice which indicates that authentication is not accepted as the authentication result to the printer 30 (step S36). Thus, the printer registration acceptance process according to this embodiment is completed.

On the other hand, when both pieces of authentication information coincide in the aforementioned step S34 (step S34: Yes), the server computer SC transmits the authentication coincidence notice which indicates that both pieces of authentication information coincide as the authentication result to the printer 30 (step S38).

Next, the server computer SC judges whether the printer information has been received from the printer 30 (step S40). When the printer information has not been received (step S40: No), the server computer SC stands by while repeating the process in step S40.

On the other hand, when the printer information has been received from the printer 30 (step S40: Yes), the server computer SC judges whether the received printer information coincides with the already registered printer information (step S42). When the received printer information and the already registered printer information coincide (step S42: Yes), the received printer information is stored in the printer information table TB10 in the printer database (step S48). Specifically, as shown in FIG. 5, the server computer SC receives "aaa.bbb.ccc.101" as the network address T10, "LP-7700" as the printer model information T12, "X1, Y1, Z1" as the printer position information T14, "with security" as the security information T16, and "print room" as the installation location information T18 from the printer 30, and stores and holds them in the printer information table TB10.

On the other hand, when the received printer information and the already registered printer information do not coincide (step S42: No), an operator of the server computer SC is allowed to confirm whether the position of the corresponding printer is moved (step S44). When a confirmation input from the operator indicates that the printer is correctly moved (step S46: Yes), the received printer information is stored in the printer information table TB10. On the other hand, when the confirmation input from the operator indicates that the printer is not correctly moved (step S46: No), the received printer information is not stored in the printer information table TB10. Thus, the printer registration acceptance process according to this embodiment will be completed.

Next, processes executed by the print clients 20 and 22 and the server computer SC when users of the print clients 20 and 22 want to acquire the printer information on the printers 30 through 36 will be explained.

Figure 9:
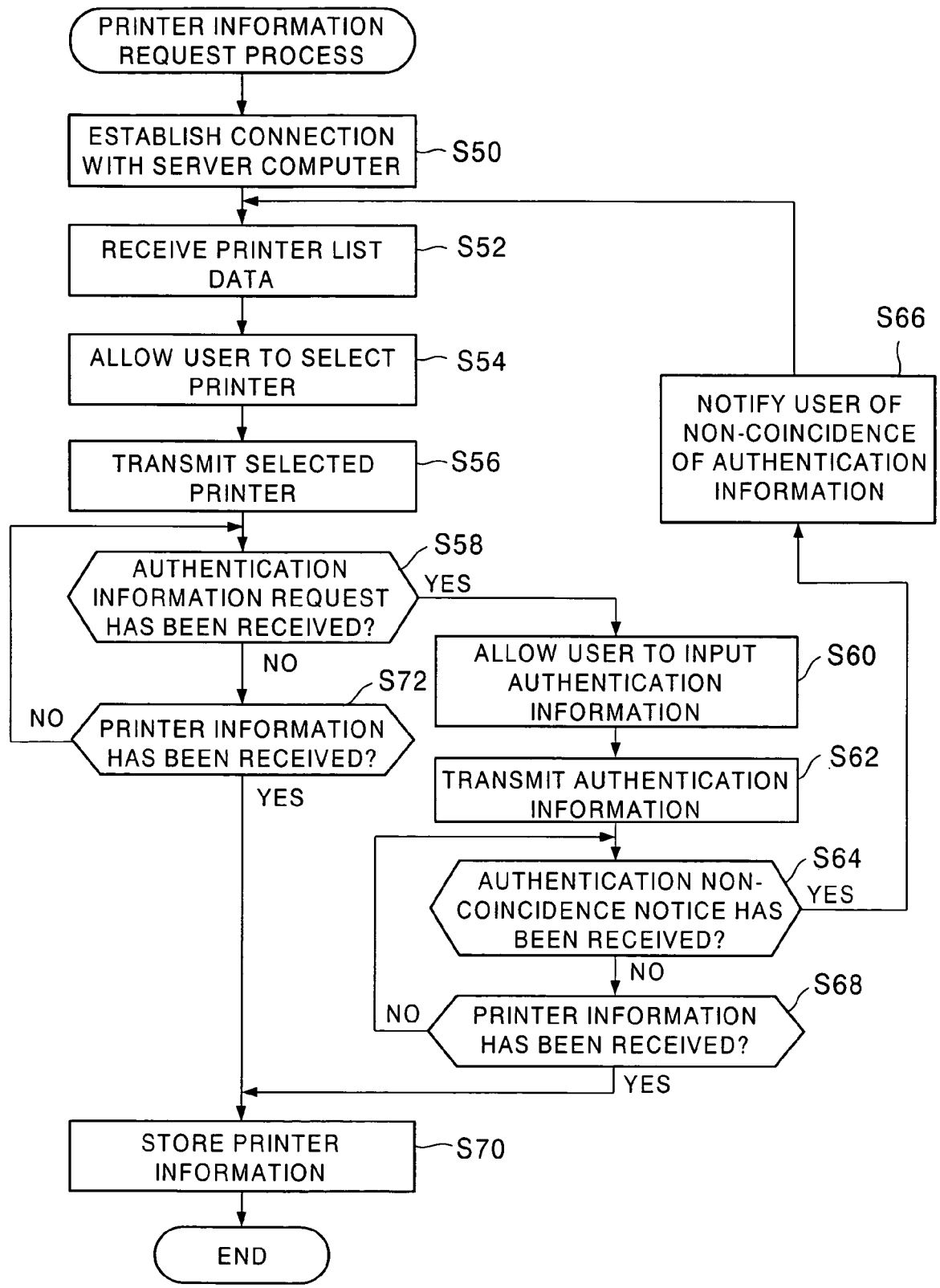
FIG. 9 is a flow chart explaining a printer information request process executed by the print client according to the first embodiment and the second embodiment of the present invention.

FIG. 9 is a flowchart explaining a printer information request process executed by the print client 20 or 22. This printer information request process is realized by making the CPU 64 read and execute a printer information request program stored in the ROM 68 or the hard disk 76 of the print client, Here, assuming a case where the print client 20 requests the printer information from the server computer SC, the following explanation is given.

As shown in FIG. 9, the print client 20 establishes a connection with the server computer SC (step S50). In this embodiment, the print client 20 ensures secrecy by SSL communication and establishes a connection with the server computer SC.

Thereafter, the print client 20 receives printer list data from the server computer SC (step S52). This printer list data corresponds to the printer model information T12, the security information T16, and the installation location information T18 out of various data items of the printer information stored in the printer information table TB10 in FIG. 5, and the network address T10 and the printer position information T14 are not contained.

Figure 10:
FIG. 10 is a diagram showing an example of a printer list screen displayed on a display of the print client according to the first embodiment and the second embodiment of the present invention.

Subsequently, the print client 20 displays the received printer list data as a printer list screen on the display 62 and allows the user to select a printer (step S54). FIG. 10 is a diagram showing an example of a printer list screen W10 displayed on the display 62 according to this embodiment.

As shown in FIG. 10, the printer list screen W10 includes the printer model information T12, the security information T16, and the installation location information T18 as data items. The user selects one printer which is installed in a place where the user wants to perform printing based on the installation location information T18. In this embodiment, the printer is selected by checking any one of check boxes CB1 through CB4 provided corresponding to respective printers with a pointing device such as a mouse. The example of FIG. 10 shows a state in which the user has selected LP-7700 in the print room.

As shown in FIG. 9, after the printer is selected by the user, the print client 20 transmits information which specifies the printer selected by the user (in this example, information indicating that the printer 30 is selected) as a selected printer to the server computer SC (step S56). Subsequently, the print client 20 judges whether an authentication information request has been received from the server computer SC (step S58). In this embodiment, when the server computer SC provides printer information on the printer with security to the user, the server computer SC requests authentication information in order to judge whether the user is authorized to perform printing with the printer.

When the authentication information request has been received (step S58: Yes), the print client 20 allows the user to input authentication information (step S60). In this embodiment, the authentication information is composed of a user ID and a password. The print client 20 then transmits the authentication information inputted by the user to the server computer SC (step S62).

Thereafter, the print client 20 judges whether an authentication non-coincidence notice has been received from the server computer SC (step S64). When the authentication non-coincidence notice has been received (step S64: Yes), the print client 20 notifies the user of a non-coincidence of the authentication information (step S66) and returns to the process in the aforementioned step S52.

On the other hand, when the authentication non-coincidence notice has not been received (step S64: No), the print client 20 judges whether printer information has been received from the server computer SC (step S68). When the printer information has not been received (step S68: No), the print client 20 stands by while repeating the aforementioned process from step S64.

On the other hand, when the printer information has been received (step S68: Yes), the received printer information is stored in a print printer table formed in the RAM 66 or the hard disk 76 of the print client 20 (step S70). The printer information received on this occasion contains the network address T10, the printer model information T12, and the printer position information T14 of the selected printer. However, the received printer information may contain the security information T16, the installation location information T18, and/or other information.

FIG. 11 is a diagram showing an example of the structure of a print printer table TB20 according to this embodiment. As shown in FIG. 11, the print printer table TB20 according to this embodiment includes the network address T10, the printer model information T12, and the printer position information T14 as data items. The received printer information is stored in the corresponding data item on a printer-by-printer basis. Incidentally, if the print printer table TB20 is formed in the RAM 66, the contents thereof are erased when the print client 20 is powered off, and consequently the secrecy of the printer information is raised. However, every time the print client 20 is powered on, the user is required to acquire printer information on a printer which the user intends to use for a print operation from the server computer SC. On the other hand, if the print printer table TB20 is formed in the hard disk 76, the acquired printer information is not erased even when the print client 20 is powered off, and hence even when the print client 20 is powered on again, the printer information stored in the hard disk 76 can be used as it is. However, since the printer information is held in the hard disk 76, there remains a possibility that someone looks surreptitiously at the printer information.

Again, as shown in FIG. 9, when it is judged in the aforementioned step S58 that the authentication information request has not been received (step S58: No), the print client 20 judges whether the printer information has been received from the server computer SC (step S72). When the printer information has not been received from the server computer SC (step S72: No), the print client 20 stands by while repeating the aforementioned process from step S58.

On the other hand, when the printer information has been received (step S72: Yes), the received printer information is stored in the print printer table TB20 (step S70). This is because, for example, when the user selects the printer installed in the entrance hall without security in the printer list screen W10, the server computer SC transmits the printer information to the print client 20 without requesting the authentication information.

Thus, the printer information request process according to this embodiment is completed.

Figure 12:
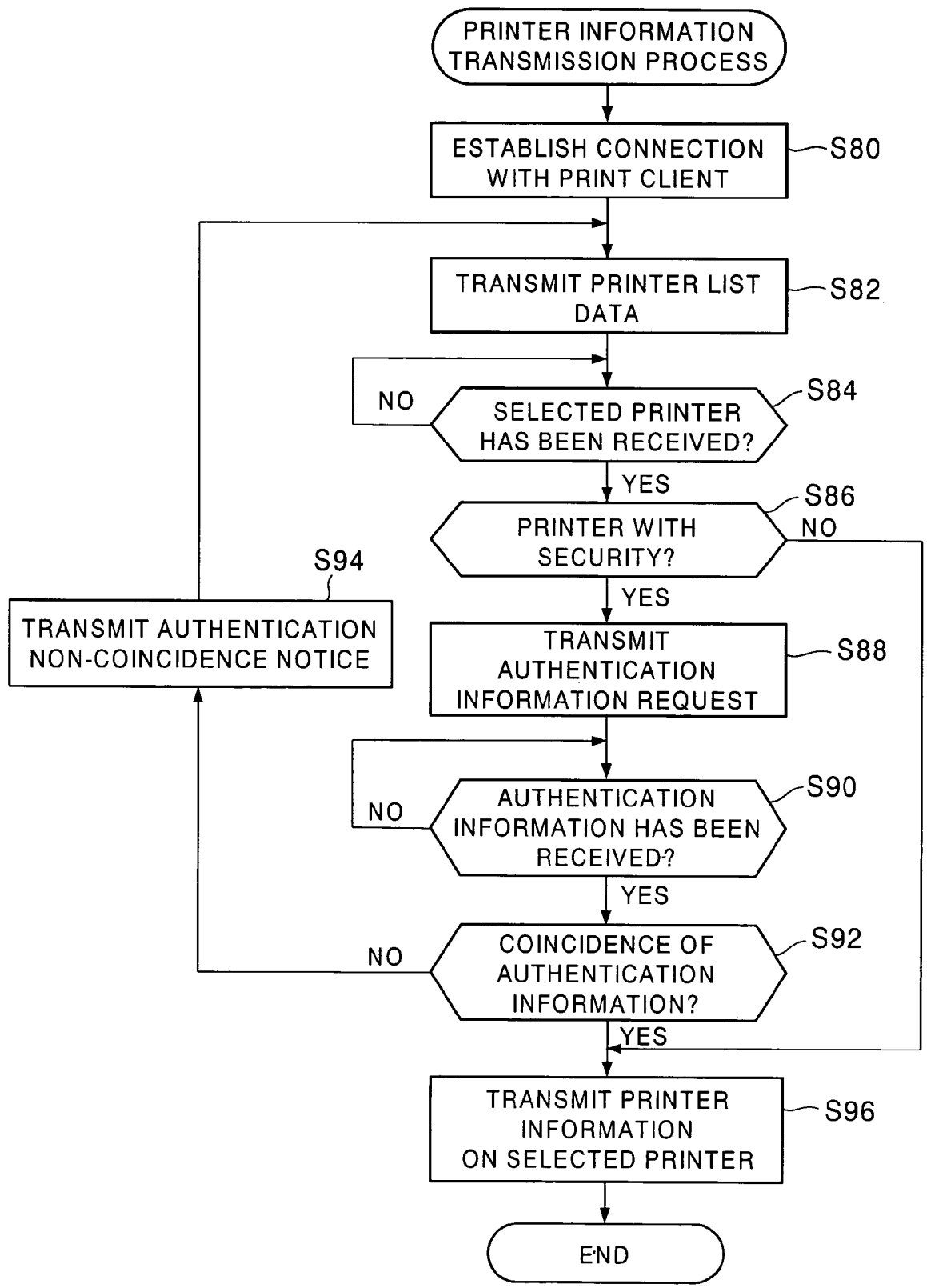
FIG. 12 is a flowchart explaining a printer information transmission process executed by the server computer according to the first embodiment and the second embodiment of the present invention.

Next, a printer information transmission process executed by the server computer SC corresponding to the printer information request process in the print clients 20 and 22 will be explained based on FIG. 12. FIG. 12 is a flowchart explaining the printer information transmission process executed by the server computer SC. This printer information transmission process is realized by making the CPU 94 read and execute a printer information transmission program stored in the ROM 98 or the hard disk 106 of the server computer SC. Also here, similarly to the above, assuming the case where the print client 20 requests the printer information from the server computer SC, the following explanation is given.

As shown in FIG. 12, the server computer SC establishes a connection with the print client 20 (step S80). This corresponds to the aforementioned step S50 on the print client 20 side. Namely, the server computer SC and the print client 20 are connected by SSL communication which ensures secrecy.

Then, the server computer SC transmits the aforementioned printer list data to the print client 20 (step S82). Specifically, the server computer SC searches the printer information table TB10 and acquires the printer model information T12, the security information T16, and the installation location information T18 on the respective printers registered with the printer information table TB10. Data on the above information is transmitted as the printer list data to the print client 20.

Thereafter, the server computer SC judges whether the selected printer has been received from the print client 20 (step S84). When the selected printer has not been received (step S84: No), the server computer SC stands by while repeating the process in step S84.

On the other hand, when the selected printer has been received (step S84: Yes), the server computer SC judges whether the selected printer selected by the user is a printer with security (step S86). Specifically, by searching the printer information table TB10, the server computer SC judges whether the security information T16 on the selected printer selected by the user is "with security" or "without security".

When the selected printer is the printer with security (step S86: Yes), the server computer SC transmits the authentication information request to the print client 20 (step S88). Then, the server computer SC judges whether the authentication information has been received from the print client 20 (step S90). When the authentication information has not been received (step S90: No), the server computer SC stands by while repeating the process in step S90.

When the authentication information has been received (step S90: Yes), whether the received authentication information coincides with the authentication information previously registered with the server computer SC is judged (step S92). As described above, in this embodiment, the user ID and the password are used as the authentication information.

FIG. 13 is a diagram showing an example of a user authentication information table TB30 with which user IDs and passwords are registered according to this embodiment. In this embodiment, the user authentication information table TB30 is formed in the hard disk 106 of the server computer SC. As shown in FIG. 13, the user authentication information table TB30 includes a user ID T20 and a password T22 as data items.

When the received user ID and password coincide with the user ID T20 and the password T22 registered with the user authentication information table TB30, the server computer SC judges that the user is authorized to perform printing with the printer with security. Incidentally, when users capable of performing printing differ from printer to printer, the user authentication information table TB30 needs to be formed for each printer. On the other hand, when the presence or absence of the print authority of users is set for all of printers managed by the server computer SC, only one user authentication information table TB30 may be formed in the server computer SC.

Again, as shown in FIG. 12, when judging that the received authentication information does not coincide with the previously registered authentication information (step S92: No), the server computer SC transmits the authentication non-coincidence notice as an authentication result to the print client 20 (step S94). Then, the server computer SC returns to the aforementioned step S82.

On the other hand, when judging that the received authentication information coincides with the previously registered authentication information (step S92: Yes), the server computer SC transmits printer information on the selected printer selected by the user to the print client 20 (step S96). Specifically, the server computer SC searches the printer information table TB10, acquires the network address T10, the printer model information T12, and the printer position information T14 on the selected printer, and transmits these network address T10, printer model information T12, and printer position information T14 to the print client 20. Similarly to the above, data other than these network address and two pieces of information on the selected printer may be transmitted to the print client 20.

Thus, the printer information transmission process according to this embodiment will be completed.

Next, processes executed by the print clients 20 and 22 and the printers 30 through 36 in a case where, when the users of the print clients 20 and 22 want to perform printing, the users of the print clients 20 and 22 transmit print requests to the printers 30 through 36 will be explained in detail.

Figure 14:
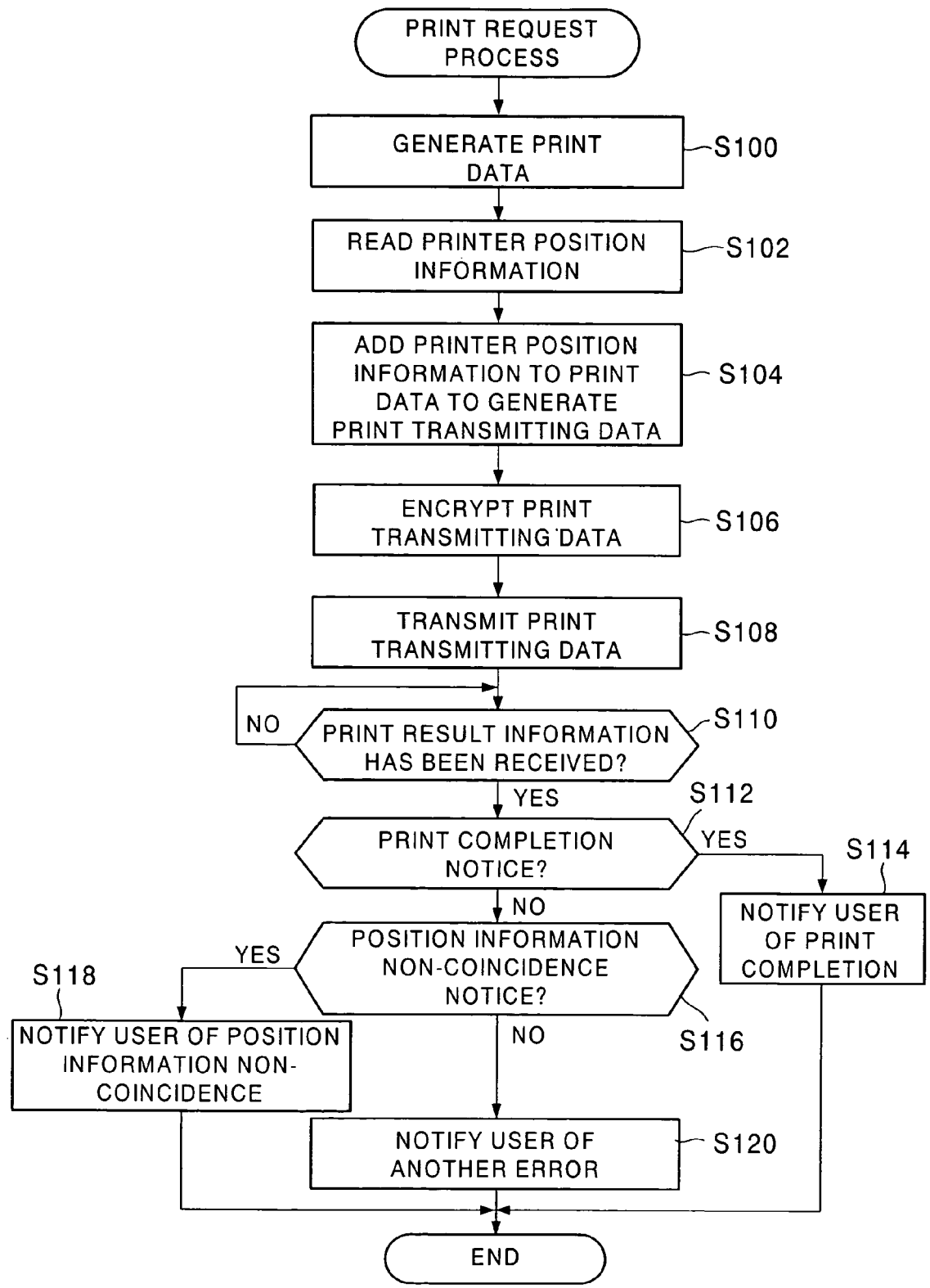
FIG. 14 is a flowchart explaining a print request process executed by the print client according to the first embodiment of the present invention.

FIG. 14 is a flowchart explaining a print request process executed by the print client 20 or 22. This print request process is realized by making the CPU64 read and execute a print request program stored in the ROM 68 or the hard disk 76 of the print client. Here, assuming a case where the print client 20 makes a print request to the printer 30, the following explanation is given.

As shown in FIG. 14, the print client 20 generates the print data D14 based on a print request from the user (step S100). The print data D14 is data necessary for an actual print operation when the printer 30 is an ordinary printer. In this embodiment, the print client 20 reads the printer model information T12 on the printer 30 from the print printer table TB20 and generates the print data D14 with a language which the printer 30 can interpret.

Then, the print client 20 reads the printer position information 14 on the printer 30 from the print printer table TB20 (step S102). Subsequently, the print client 20 adds the read printer position information D12 to the print data D14 to generate the print transmitting data D10 (step S104).

Thereafter, the print client 20 encrypts the print transmitting data D10 (step S106). Then, the print client 20 transmits the encrypted print transmitting data D10 to the printer 30 (step S108). Specifically, the print client 20 designates the network address of the printer 30 and sends out the print transmitting data D10 to the network 10. Incidentally, the print client 20 directly transmits the print transmitting data D10 to the printer 30 via the network 10 in this embodiment, but the print client 20 may transmit the print transmitting data D10 via the server computer SC.

Subsequently, the print client 20 judges whether print result information has been received from the printer 30 (step S110). When the print result information has not been received (step S110: No), the print client 20 stands by while repeating the process in step S110. On the other hand, when the print result information has been received (step S110: Yes), the print client 20 judges whether the print result information is a print completion notice (step S112).

When this print result information is the print completion notice (step S112: Yes), it means that the printer 30 has properly completed the print operation, and hence the print client 20 notifies the user that the printer 30 has completed the print operation (step S114). On the other hand, when the received print result information is not the print completion notice (step S112: No), the print client 20 judges whether the print result information is a position information non-coincidence notice (step S116).

When the print result information is the position information non-coincidence notice (step S116: Yes), the print client 20 notifies the user that since the printer position information D12 of the print transmitting data D10 and the current printer position information on the printer 30 do not coincide, printing is not performed (step S118). On the other hand, when the print result information is not the position information non-coincidence notice (step S116: No), it is thought that some other error occurs, and hence the print client 20 gives notice according to the type of the error to the user (step S120).

The print request process executed by the print client 20 is completed by the notice in step S114, step S118, or step S120.

Figure 15:
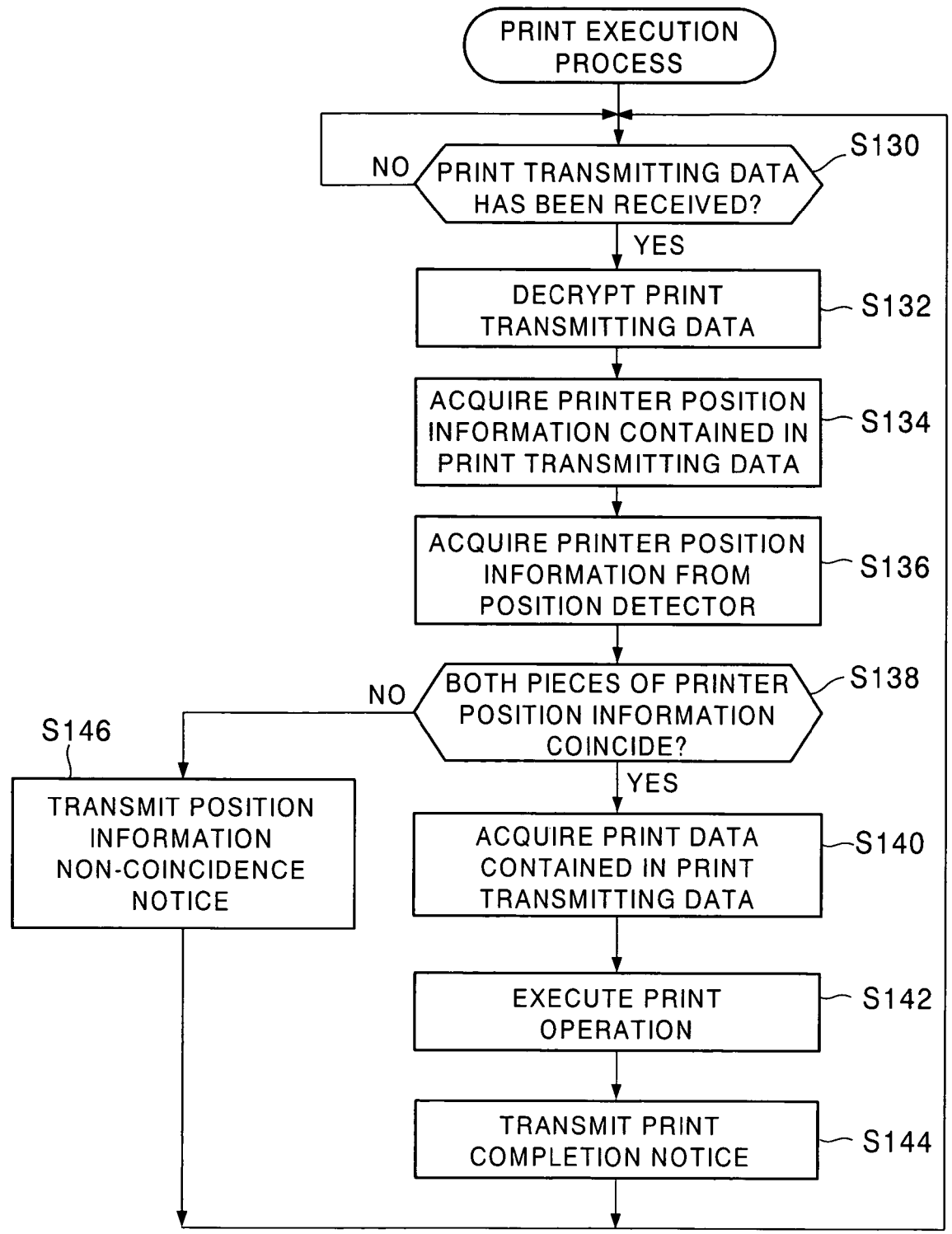
FIG. 15 is a flowchart explaining a print execution process executed by the printer according to the first embodiment of the present invention.

Next, a print execution process executed by the printers 30 through 36 corresponding to the print request process in the print clients 20 and 22 will be explained based on FIG. 15. FIG. 15 is a flowchart explaining the print execution process executed by the printers 30 through 36. This print execution process is realized by making the CPU 40 read and execute a print execution program stored in the ROM 44 of each of the printers 30 through 36. Also here, similarly to the above, assuming the case where the print client 20 makes a print request to the printer 30, the following explanation is given.

As shown in FIG. 15, the printer 30 judges whether the print transmitting data D10 has been received from the network 10 (step S130). When no print transmitting data D10 has been received (step S130: No), the printer 30 stands by while repeating the process in step S130.

On the other hand, when the print transmitting data D10 has been received (step S130: Yes), the printer 30 decrypts the print transmitting data D10 (step S132). Subsequently, the printer 30 acquires the printer position information D12 contained in the decrypted print transmitting data D10 (step S134).

Thereafter, the printer 30 acquires printer position information on the printer 30 at this point in time from the position detector 54 (step S136). The reason why the printer position information is acquired from the position detector 54 each time as described above is that, when the printer 30 is moved to a different place, there is a possibility that the printer 30 is installed in a place where the user does not intend to perform printing, and that in such a case, a print operation cannot be executed by the printer 30.

Then, the printer 30 judges whether the printer position information D12 contained in the print transmitting data D10 and the printer position information on the printer 30 at this point in time which is acquired in step S136 coincide (step S138). Specifically, whether the latitude, longitude, and altitude of the printer position information D12 and the latitude, longitude, and altitude of the printer position information acquired in step S136 coincide is judged. When two pieces of printer position information coincide (step S138: Yes), the printer 30 acquires the print data D14 contained in the print transmitting data D10 (step S140). Namely, in this embodiment, when the printer position information D12 contained in the print transmitting data D10 and the printer position information acquired in step S136 coincide, it is judged that the print transmitting data D10 matches the printer position information at this point in time.

Thereafter, the printer 30 executes a print operation by driving the print engine 52 based on the print data D14 (step S142). Specifically, the printer 30 performs a language interpretation of the print data D14 and generates print request data fitting the print engine 52. Then, by transmitting this print request data to the print engine 52, print sheets and so on are printed by the print engine 52.

At a point in time when the print operation has been properly completed, the printer 30 transmits the print completion notice that the print operation has been properly completed as the print result information to the print client 20 (step S144). Then, the printer 30 returns to the aforementioned process in step S130.

Contrary to this, when the printer position information D12 contained in the print transmitting data D10 and the printer position information acquired in step S136 do not coincide (step S138: No), the printer 30 transmits the position information non-coincidence notice as the print result information to the print client 20 (step S146). Namely, in this embodiment, when the printer position information D12 contained in the print transmitting data D10 and the printer position information acquired in step S136 do not coincide, it is judged that the print transmitting data D10 does not match the printer position information at this point in time. Then, the printer 30 returns to the aforementioned process in step S130.

As described above, according to the print system of this embodiment, the print client 20 or 22 can limit a printer capable of printing the transmitted print transmitting data D10 based on the printer position information, and hence the execution of a print operation by a printer installed in a position where the user of the print client 20 or 22 does not intend to perform printing can be avoided. For example, even if the print transmitting data D10 is transmitted by mistake to the printer 30 from the print client 20 when the printer 30 is moved to a different place but the network address of the printer 30 in the network 10 remains unchanged, the printer position information D12 contained in the print transmitting data D10 and the printer position information at this point in time do not coincide in the case of the printer 30, whereby the print data D14 is not printed. Consequently, the security of print data can be enhanced.

On the other hand, also on the printer 30 or 32 side which ensures security, the transmission of print data to the printer 30 or 32 by somebody who is not duly authorized to perform printing with the printer 30 or 32 and the execution of a large print operation by the printer 30 or 32 can be avoided. For example, even when a third party can know the network address of the printer 30 and tries to transmit the print transmitting data D10 to the printer 30 for some reason, the server computer SC does not provide the printer position information D12 on the printer 30 without a user authentication information coincidence, and hence the user cannot make the printer 30 execute a print operation. Consequently, the security of the printer 30 itself can be enhanced.

Moreover, in this embodiment, the server computer SC manages at least the printer position information T14 on the respective printers 30 through 36 in a concentrated manner, whereby even in the case of the printers 30 and 32 with security, users which have rightful authority can easily acquire the printer position information T14 on these printers 30 and 32 from the server computer SC.

Further, the server computer SC manages the network address T10, the printer model information T12, the security information T16, and the installation location information T18 in addition to the printer position information T14 in a concentrated manner, and hence users can easily know models and locations of the printers which are installed at present in this network 10. Furthermore, the installation location information T18 on printers is displayed on the printer list screen W10 in FIG. 10, whereby whether the printers are installed in positions where the users want to perform printing can be easily known.

Additionally, the server computer SC provides the network address T10 and the printer model information T12 in addition to the printer position information T14 of each printer to the users which have rightful authority, whereby the users can easily acquire information necessary to perform printing with each printer. Consequently, user-friendliness increases.

Second Embodiment

In the second embodiment of the present invention, each printer generates a public key by using at least printer position information indicating a position where the printer is installed, and this public key is managed by the server computer SC. A user of a print client acquires a public key of a printer with which the user wants to perform printing from the server computer SC, and when the print client transmits print data to this printer, print transmitting data is generated by encrypting the print data with the acquired public key and transmitted to the printer. Moreover, the printer which has received the print transmitting data generates a private key using at least printer position information at this point in time, and the printer executes a print operation only when the print transmitting data can be decrypted with the private key. Further details will be given below.

It should be noted that the hardware configuration of a print system according to this embodiment is the same as that in FIG. 1 in the aforementioned first embodiment, the hardware configurations of the printers 30 through 36 are the same as that in FIG. 2A or FIG. 2B described above, the hardware configurations of the print clients 20 and 22 are the same as that in FIG. 3A or FIG. 3B described above, and the hardware configuration of the server computer SC is the same as that in FIG. 4 described above.

However, the structure of a printer information table formed in the hard disk 106 in the server computer SC is partially different from the structure of the printer information table TB10 in FIG. 5. FIG. 16 is a diagram showing the structure of a printer information table 100 according to this embodiment.

As shown in FIG. 16, the printer information table TB100 according to this embodiment includes a public key T100 in place of the printer position information T14 as an data item. This public key T100 stores public keys generated by the respective printers 30 through 36. As will be described in detail later, each of the printers 30 through 36 generates the public key T100 with a passphrase containing at least its printer position information by public key cryptography.

Next, a printer registration request process executed by the printers 30 through 36 when printer information is registered with the server computer SC will be explained. It should be mentioned that a printer registration acceptance process executed by the server computer SC corresponding to the printer registration request process is the same as that in the aforementioned first embodiment.

Figure 17:
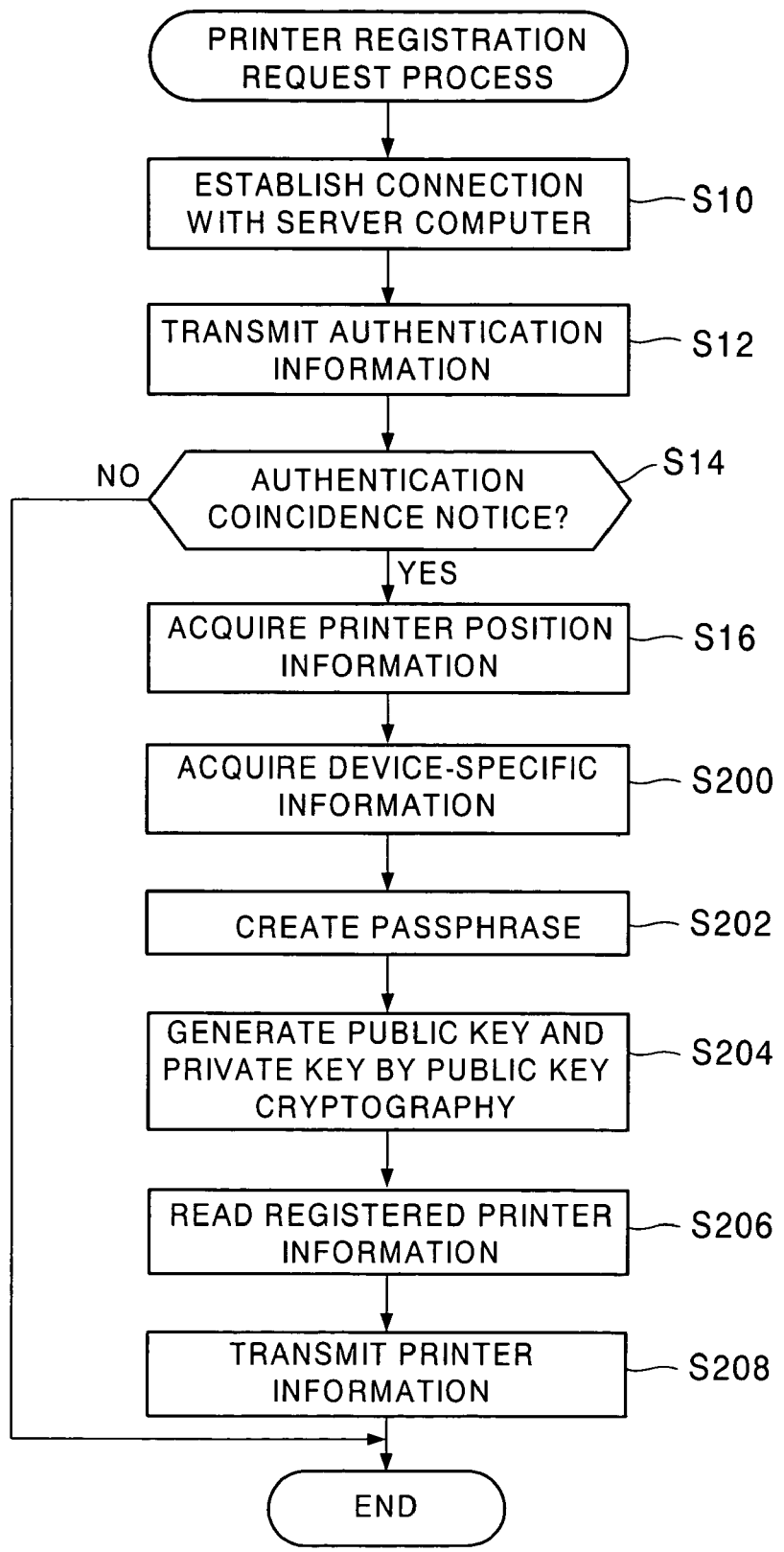
FIG. 17 is a flowchart explaining a printer registration request process executed by the printer according to the second embodiment of the present invention.

FIG. 17 is a flowchart explaining the printer registration request process executed by the printers 30 through 36. The printer registration request process according to this embodiment is the same as that in the aforementioned first embodiment from step S10 to step S16. However, the process in and after step S200 subsequent to step S16 is different, and hence a different portion of the process will be explained with the printer 30 as an example similarly to the above.

As shown in FIG. 17, subsequent to step S16, the printer 30 acquires device-specific information on the printer 30 (step S200). Here, the device-specific information is identification information specifically assigned to the printer 30, and it is, for example, a manufacturer's serial number, an MAC address, or the like of the printer 30.

Thereafter, the printer 30 creates a passphrase with the device-specific information and the printer position information (step S202). There are various methods of creating the passphrase. In this embodiment, the passphrase is created by simply joining the printer position information after the device-specific information. Incidentally, the passphrase may contain data other than these device-specific information and printer position information.

Then, the printer 30 generates a public key and a private key with the created passphrase by the public key cryptography (step S204). The public key cryptography has the property that the same public key and private key are generated again if the same passphrase is used. Incidentally, this public key constitutes printer position depending information dependent on a printer position in this embodiment. Moreover, the private key is abandoned without being saved.

Subsequently, the printer 30 acquires printer information, for example, stored in the EEPROM 56 (step S206). Namely, the printer 30 acquires its own network address, printer model information, security information, and installation location information. Then, the printer 30 transmits these public key, network address, printer model information, security information, and installation location information as the printer information to the server computer SC (step S208). Thus, the printer registration request process according to this embodiment is completed.

Next, as concerns processes executed by the print clients 20 and 22 and the server computer SC when the users of the print clients 20 and 22 want to acquire the printer information on the printers 30 through 36, a printer information request process executed by the print client 20 and a printer information transmission process executed by the server computer SC are the same as those in the aforementioned first embodiment. However, the structure of a print printer table formed in each of the print clients 20 and 22 is partially different from that of the print printer table TB20 in FIG. 11 described above.

FIG. 18 is a diagram showing the structure of a print printer table TB110 according to this embodiment. As shown in FIG. 18, the print printer table TB110 according to this embodiment includes the public key T100 in place of the printer position information T14 of the print printer table TB20. Namely, in the printer information request process, the network address T10, the printer model information T12, and the public key T100 are transmitted as the printer information from the server computer SC to the print client 20, and therefore the print client 20 stores these network address T10, printer model information T12, and public key T100 in the print printer table TB110.

Next, a print request process executed by the print clients 20 and 22 and a print execution process executed by the printers 30 through 36 when users performs printing with the printers 30 through 36 will be explained.

Figure 19:
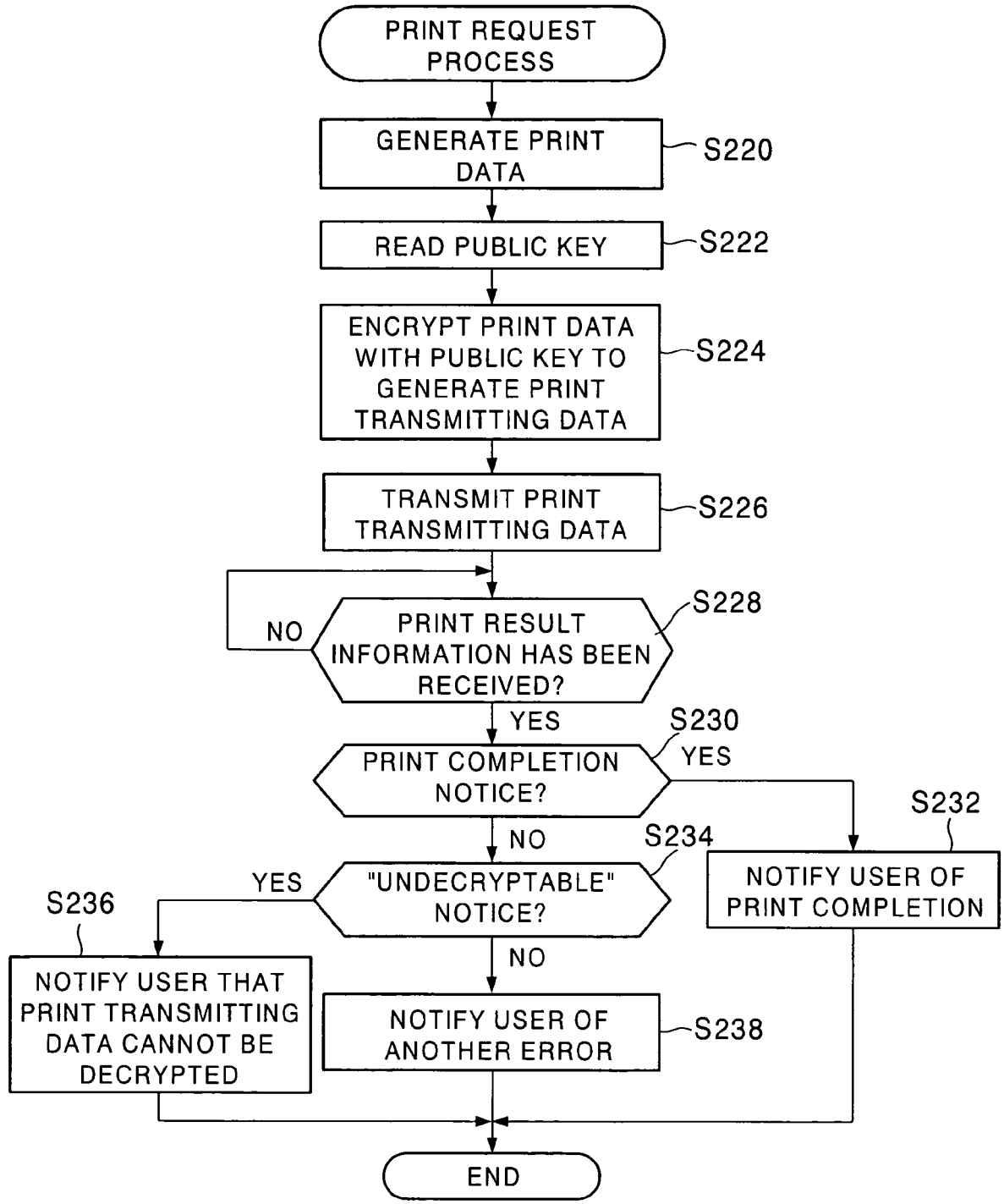
FIG. 19 is a flowchart explaining a print request process executed by the print client according to the second embodiment of the present invention.

FIG. 19 is a flowchart explaining the print request process executed by the print client 20 or 22. This print request process is realized by making the CPU 64 read and execute a print request program stored in the ROM 68 or the hard disk 76 of the print client. Here, assuming a case where the print client 20 makes a print request to the printer 30, the following explanation is given.

As shown in FIG. 19, the print client 20 generates print data based on a print request from the user (step S220). This print data is data necessary for an actual print operation when the printer 30 is an ordinary printer. In this embodiment, the print client 20 reads the printer model information T12 on the printer 30 from the print printer table TB110 and generates the print data in a language which the printer 30 can interpret.

Then, the print client 20 reads the public key of the printer 30 from the print printer table TB110 (step S222). Subsequently, the print client 20 encrypts the print data with the public key of the printer 30 to generate the print transmitting data (step S224). Incidentally, the print transmitting data may contain data other than the print data.

Thereafter, the print client 20 transmits the encrypted print transmitting data to the printer 30 (step S226). Specifically, the print client 20 designate the network address of the printer 30 and sends out the print transmitting data to the network 10. Incidentally, the print client 20 directly transmits the print transmitting data to the printer 30 via the network 10 in this embodiment, but the print client 20 may transmit the print transmitting data via the server computer SC.

Subsequently, the print client 20 judges whether print result information has been received from the printer 30 (step S228). when the print result information has not been received (step S228: No), the print client 20 stands by while repeating the process in step S228. On the other hand, when the print result information has been received (step S228: Yes), whether the print result information is a print completion notice is judged (step S230).

When this print result information is the print completion notice (step S230: Yes), it means that the printer 30 has properly completed the print operation, and hence the print client 20 notifies the user that the printer 30 has completed the print operation (step S232). On the other hand, when the received print result information is not the print completion notice (step S230: No), whether the print result information is an undecryptable notice is judged (step S234).

When the print result information is the undecryptable notice (step S234: Yes), the print client 20 notifies the user that since the print transmitting data cannot be decrypted by the printer 30, the print operation is not executed (step S236). On the other hand, when the print result information is not the undecryptable notice (step S234: No), it is thought that some other error occurs, and hence the print client 20 gives notice according to the type of the error to the user (step S238).

The print request process in the print client 20 is completed by the notice in step S232, step S236, or step S238.

Figure 20:
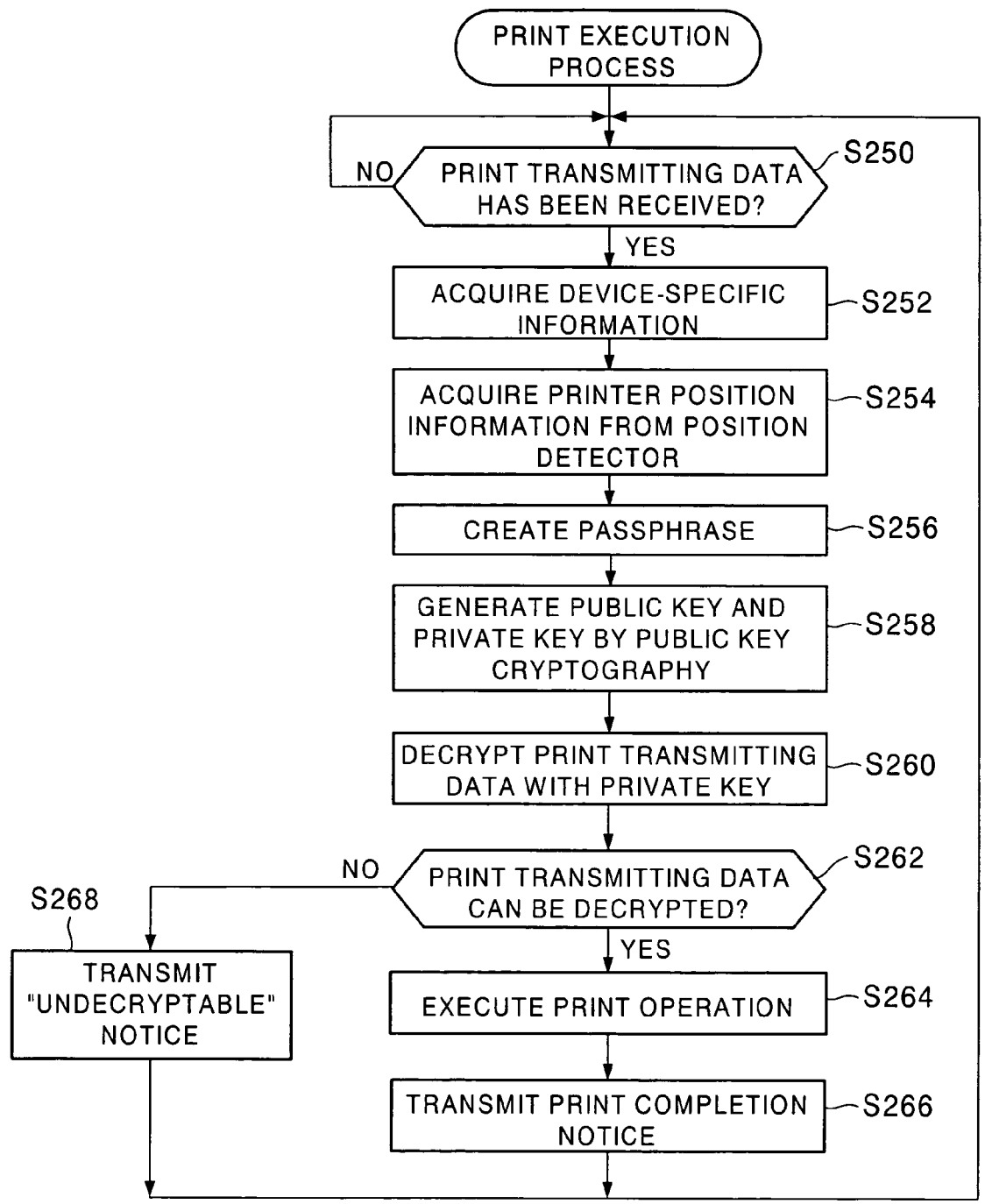
FIG. 20 is a flowchart explaining a print execution process executed by the printer according to the second embodiment of the present invention.

Next, a print execution process executed by the printers 30 through 36 corresponding to the print request process in the print clients 20 and 22 will be explained based on FIG. 20. FIG. 20 is a flowchart explaining the print execution process executed by the printers 30 through 36. This print execution process is realized by making the CPU 40 read and execute a print execution program stored in the ROM 44 of each of the printers 30 through 36. Also here, similarly to the above, assuming the case where the print client 20 makes a print request to the printer 30, the following explanation is given.

As shown in FIG. 20, the printer 30 judges whether the print transmitting data has been received from the network 10 (step S250). When no print transmitting data has been received (step S250: No), the printer 30 stands by while repeating the process in step S250.

On the other hand, when the print transmitting data has been received (step S250: Yes), the printer 30 acquires its own device-specific information (step S252). Subsequently, the printer 30 acquires printer position information on the printer 30 at this point in time from the position detector 54 (step S254). The reason why the printer position information is acquired from the position detector 54 each time as described above is that, when the printer 30 is moved to a different place, there is a possibility that the printer 20 is installed in a place where the user does not intend to perform printing, and that in such a case, a print operation cannot be executed by the printer 30.

Then, the printer 30 creates a passphrase based on the device-specific information and the printer position information (step S256). The method of creating the passphrase needs to be the same as that in step S202 in the aforementioned printer registration request process. This is because the print transmitting data encrypted with the public key acquired by the print client cannot be decrypted with the private key if the passphrase is different.

Thereafter, the printer 30 generates a public key and a private key with the passphrase by the public key cryptography (step S258). Subsequently, the printer 30 decrypts the received print transmitting data with the generated private key to acquire the print data (step S260).

Then, the printer 30 judges whether the print transmitting data can be decrypted by the private key (step S262). When the print transmitting data can be decrypted (step S262: Yes), the printer 30 executes a print operation by driving the print engine 52 based on the acquired print data (step S264). Specifically, the printer 30 performs a language interpretation of the print data and generates print request data fitting the print engine 52. Then, by transmitting this print request data to the print engine 52, print sheets and so on are printed by the print engine 52.

As can be seen from the above, in this embodiment, when the private key is generated with the passphrase containing at least the printer position information detected by the position detector 54 and the print transmitting data can be decrypted with this private key, it is judged that the print transmitting data matches the printer position information.

At a point in time when the print operation has been properly completed, the printer 30 transmits a print completion notice that the print operation has been properly completed as the print result information to the print client 20 (step S266). Then, the printer 30 returns to the aforementioned process in step S250.

Contrary to this, when it is judged in step S262 that the print transmitting data cannot be decrypted (step S262: No), the printer 30 transmits the undecryptable notice as the print result information to the print client 20 (step S268). Namely, in this embodiment, when the private key is generated with the passphrase containing at least the printer position information detected by the position detector 54 and the print transmitting data cannot be decrypted with this private key, it is judged that the print transmitting data does not match the printer position information. Then, the printer 30 returns to the aforementioned process in step S250.

As described above, according to the print system of this embodiment, the print client 20 or 22 can limit a printer capable of printing the transmitted encrypted print transmitting data based on the printer position information and hence the execution of a print operation by a printer installed in a position where the user of the print client 20 or 22 does not intend to perform printing can be avoided. For example, even if the print transmitting data is transmitted by mistake to the printer 30 from the print client 20 when the printer 30 is moved to a different place but the network address of the printer 30 in the network 10 remains unchanged, in the printer 30, the printer position information is changed, whereby the passphrase created in the step S256 is different from that before the movement. Hence, the print transmitting data cannot be decrypted with a private key generated with this passphrase, and thereby a print operation cannot be executed by the printer 30. Consequently, the security of print data can be enhanced.

On the other hand, also on the printer 30 or 32 side which ensures security, the transmission of print data to the printer 30 or 32 by somebody who is not duly authorized to perform printing by the printer 30 or 32 and the execution of a large print operation by the printer 30 or 32 can be avoided. For example, even when a third party can know the network address of the printer 30 and tries to acquire the public key of the printer 30 for some reason, the server computer SC does not provide the public key because of a non-coincidence of authentication information. Accordingly, the user cannot acquire the public key of the printer 30. Even if the user generates print transmitting data by encrypting print data with a different public key or generates print transmitting data without encryption and transmits the print transmitting data to the printer 30, it is judged in step S262 of the print execution process that the print transmitting data cannot be decrypted, and hence the user cannot make the printer 30 execute a print operation. Consequently, the security of the printer 30 itself can be enhanced.

Moreover, in this embodiment, the passphrase contains the device-specific information, and hence even if the third party can know the position of the printer 30 for some reason, the passphrase used in the printer 30 cannot be specified unless the device-specific information on the printer 30 is known. Consequently, the possibility that the third person who has no rightful authority performs printing with the printer 30 can be greatly reduced.

Further, similarly to the aforementioned first embodiment, the server computer SC manages the network address T10, the printer model information T12, and the public key T100 of each of the printers 30 through 36, and hence the users who have rightful authority can easily acquire the above information from the server computer SC. Consequently, user-friendliness increases.

It should be mentioned that the present invention is not limited to the aforementioned embodiments, and various changes may be made therein. For example, in the aforementioned embodiments, as an example in which the printers 30 through 36 restrict a print request, the case where a print operation is not executed is explained, but the print request restriction is not limited to the above case. For example, it is also possible that when printer positions match, there is no restriction on the number of print sheets, and that when the printer positions do not match, the number of print sheets is restricted to 10. Alternatively, it is also possible that when the printer positions match, both color print and black-and-white print are possible, and that when the printer positions do not match, print is limited to only black-and-white print. Further, it is also possible that when the printer positions do not match, only a print request of print data transmitted from an IP address which is previously registered with the printer is executed.

Furthermore, in the aforementioned second embodiment, the printers 30 through 36 execute a print operation only when the received print transmitting data can be decrypted with the private key, but regardless of whether the print transmitting data can be decrypted, a print operation may be executed based on data acquired by decryption. In this case, when the print transmitting data cannot be decrypted properly with the private key, the printers 30 through 36 execute a meaningless print operation, and hence the user cannot obtain a meaningful print result.

In addition, the present invention is explained with the print client as an example of a data transmitting device which transmits data whose security is to be ensured and the printer as an example of a data receiving device which receives the data in the aforementioned embodiments, but a combination of the data transmitting device and the data receiving device in a data transmitting and receiving system is not limited to that in the aforementioned embodiments. For example, in the data transmitting and receiving system, the data transmitting device may be a digital camera for taking images and the data receiving device may be a data server which stores data on the images taken by the digital camera. In this case, transmitting data transmitted from the digital camera is received by the data server, and when this transmitting data matches device position information at this point in time in the data server, the data server stores data contained in the transmitting data, and when the transmitting data and the device position information at this point in time do not match, the data sever does not store the data contained in the transmitting data.

Moreover, in the data transmitting and receiving system, the data transmitting device may be a personal computer and the data receiving device may be a projector which projects image data transmitted from the personal computer. In this case, transmitting data transmitted from the personal computer is received by the projector, and when this transmitting data matches device position information at this point in time in the projector, the projector projects data contained in the transmitting data, and when the transmitting data and the device position information at this point in time do not match, the projector does not project the data contained in the transmitting data.

Further, in the data transmitting and receiving system, the data transmitting device may be a content server for music or the like and the data receiving device may be a playback device for content data such as music transmitted from the content server. In this case, transmitting data transmitted from the content server is received by the playback device, and when this transmitting data matches device position information at this point in time in the playback device, the playback device plays back data contained in the transmitting data, and when the transmitting data and the device position information at this point in time do not match, the playback device does not play back the data contained in the transmitting data.

In the case of each of these data transmitting and receiving systems, a server computer which manages device information on the data receiving device is provided, and the data transmitting device acquires device information on the data receiving device from the server computer. Namely, the data transmitting device acquires device position information and a public key from the server computer.

Moreover, in the aforementioned embodiments, the network addresses T10, the printer model information T12, the security information T16, and the installation location information T18 of the printers 30 to 36 are transmitted from the printers 30 through 36 to the server computer SC via the network 10, but the network addresses T10, the printer model information T12, the security information T16, and the installation location information T18 may be directly set and registered with the server computer by managers who manage these printers 30 through 36.

Furthermore, the aforementioned embodiments are explained with the case where a print medium for the printers 30 through 36 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print client 20 or 22 and/or the printers 30 through 36 read the record medium on which this program is recorded and execute this program.

The print client 20 or 22 and/or the printers 30 through 36 sometimes has other programs such as an operating system, other application programs, and the like. In this case, by using these other programs in the print client 20 or 22 and/or the printers 30 through 36, a command, which calls a program to realize a process equal to that in the aforesaid embodiments out of programs in the print client 20 or 22 and/or the printers 30 through 36, may be recorded on the record medium.

Further, such a program can be distributed not in the form of the record medium but in the form of a carrier wave via a network. The program transmitted in the form of the carrier wave over the network is incorporated in the client 20 or 22 and/or the printers 30 through 36, and the aforesaid embodiments can be realized by executing this program.

Furthermore, when being recorded on the record medium or transmitted as the carrier wave over the network, the program is sometimes encrypted or compressed. In this case, the print client 20 or 22 and/or the printers 30 through 36 which has read the program from the record medium or the carrier wave needs to execute the program after decrypting or expanding it.

What is claimed is:

1. A print system including one or more than one printer and a server computer to manage the printer, wherein the printer comprises:

a printer position acquisition which acquires a printer position to specify a position where the printer is installed;

a printer information generator which generates printer position depending information dependent on the printer position acquired by the printer position acquisition; and a first printer information provider which provides the printer position depending information generated by the printer information generator to the server computer, the server computer comprises:

a printer information storage which stores the printer position depending information provided from the printer; and a second printer information provider which provides the printer position depending information stored in the printer information storage to a print client in response to a request from the print client, and the printer further comprises:

a print transmitting data receiver which receives print transmitting data transmitted from the print client;

a judgment section which judges whether the print transmitting data received by the print transmitting data receiver matches a printer position acquired from the printer position acquisition at a point in time when the print transmitting data is received; and a print restriction which executes a print operation based on the print transmitting data when the judgment section judges that the print transmitting data matches the printer position and restricts the print operation based on the print transmitting data when the judgment section judges that the print transmitting data does not match the printer position.

2. The print system according to claim 1, wherein the printer information generator uses the printer position itself, which is acquired by the printer position acquisition, as the printer position depending information.

3. The print system according to claim 2, wherein the print client generates the print transmitting data by adding the printer position as the printer position depending information to print data and transmits the print transmitting data to the printer.

4. The print system according to claim 3, wherein, when the printer position added to the print transmitting data and the printer position acquired at the point in time when the print transmitting data is received coincide, the judgment section judges that the print transmitting data matches the printer position.

5. The print system according to claim 4, wherein the print restriction does not execute the print operation based on the print transmitting data when the judgment section judges that the print transmitting data does not match the printer position.

6. The print system according to claim 1, wherein the printer information generator generates a public key with a passphrase containing at least the printer position acquired by the printer position acquisition and uses the public key as the printer position depending information.

7. The print system according to claim 6, wherein the print client generates the print transmitting data by encrypting print data with the public key and transmits the print transmitting data to the printer.

8. The print system according to claim 7, wherein the judgment section generates a private key with a passphrase containing at least the printer position acquired at the point in time when the print transmitting data is received, and the judgment section judges that the print transmitting data matches the printer position when the print transmitting data is allowed to be decrypted with the private key.

9. The print system according to claim 8, wherein the print restriction does not execute the print operation based on the print transmitting data when the judgment section judges that the print transmitting data does not match the printer position.

10. The print system according to claim 1, wherein the server computer further comprises:

an authentication information acquisition which acquires authentication information from the print client; and an authentication information judgment section which judges whether the authentication information acquired by the authentication information acquisition and previously registered registration authentication information match, and the second printer information provider provides the printer position depending information to the print client only when the authentication information judgment section judges that the authentication information and the registration authentication information match.

11. The print system according to claim 10, wherein the printer information storage further stores security information indicating the presence or absence of a need to ensure security of the printer, the server computer further comprises a security judgment section which searches the security information on the printer stored in the printer information storage when the printer position depending information on the printer is requested by the print client and judges whether the printer on which the printer position depending information is requested by the print client is a printer with the need to ensure security, and the second printer information provider provides the printer position depending information on the printer to the print client only when the authentication information judgment section judges that the authentication information and the registration authentication information match when the security judgment section judges that the printer on which the printer position depending information is requested by the print client is the printer with the need to ensure security.

12. The print system according to claim 11, wherein the printer information storage further stores printer model information to specify a model of the printer, and the second printer information provider further provides the printer model information to the print client.

13. The print system according to claim 12, wherein the printer information storage further stores printer address information to specify an address in a network of the printer, and the second printer information provider further provides the printer address information to the print client.

14. A method of controlling a print system including one or more than one printer and a server computer to manage the printer, comprising the steps of:

acquiring a printer position to specify a position where the printer is installed from a printer position acquisition;

generating printer position depending information dependent on the printer position acquired from the printer position acquisition;

providing the printer position depending information from the printer to the server computer;

storing the printer position depending information provided from the printer in a printer information storage in the server computer;

providing the printer position depending information stored in the printer information storage to a print client in response to a request from the print client;

receiving print transmitting data transmitted from the print client in the printer;

judging whether the received print transmitting data matches a printer position acquired from the printer position acquisition at a point in time when the print transmitting data is received;

executing a print operation based on the print transmitting data when it is judged that the print transmitting data matches the printer position; and restricting the print operation based on the print transmitting data when it is judged that the print transmitting data does not match the printer position.

15. The method of controlling the print system according to claim 14, wherein the step of generating the printer position depending information comprises the step of using the printer position itself, which is acquired by the printer position acquisition, as the printer position depending information.

16. The method of controlling the print system according to claim 15, further comprising the step of generating the print transmitting data by adding the printer position as the printer position depending information to print data in the print client and transmitting the print transmitting data to the printer.

17. The method of controlling the print system according to claim 16, wherein the judging step comprises the step of, when the printer position added to the print transmitting data and the printer position acquired at the point in time when the print transmitting data is received coincide, judging that the print transmitting data matches the printer position.

18. The method of controlling the print system according to claim 17, wherein, in the step of restricting the print operation, the print operation based on the print transmitting data is not executed when it is judged that the print transmitting data does not match the printer position.

19. The method of controlling the print system according to claim 14, wherein the step of generating the printer position depending information comprises the step of generating a public key with a passphrase containing at least the printer position acquired by the printer position acquisition and using the public key as the printer position depending information.

20. The method of controlling the print system according to claim 19, further comprising the step of generating the print transmitting data by encrypting print data with the public key in the print client and transmitting the print transmitting data to the printer.

21. The method of controlling the print system according to claim 20, wherein the judging step comprises the step of generating a private key with a passphrase containing at least the printer position acquired at the point in time when the print transmitting data is received and judging that the print transmitting data matches the printer position when the print transmitting data is allowed to be decrypted with the private key.

22. The method of controlling the print system according to claim 21, wherein, in the step of restricting the print operation, the print operation based on the print transmitting data is not executed when it is judged that the print transmitting data does not match the printer position.

23. The method of controlling the print system according to claim 14, further comprising the steps of:

acquiring authentication information from the print client in the server computer; and judging whether the acquired authentication information and previously registered registration authentication information match, wherein, in the step of providing the printer position depending information to the print client, the printer position depending information is provided to the print client only when the authentication information and the registration authentication information match.

24. The method of controlling the print system according to claim 23, further comprising the steps of:

storing security information indicating the presence or absence of a need to ensure security of the printer in the printer information storage; and searching the security information on the printer stored in the printer information storage when the printer position depending information on the printer is requested by the print client and judging whether the printer on which the printer position depending information is requested by the print client is a printer with the need to ensure security, wherein, in the step of providing the printer position depending information to the print client, the printer position depending information on the printer is provided to the print client only when the authentication information and the registration authentication information match when it is judged that the printer on which the printer position depending information is requested by the print client is the printer with the need to ensure security.

25. The method of controlling the print system according to claim 24, further comprising the steps of:

storing printer model information to specify a model of the printer in the printer information storage; and providing the printer model information extracted from the printer information storage from the server computer to the print client.

26. The method of controlling the print system according to claim 25, further comprising the steps of:

storing printer address information to specify an address in a network of the printer in the printer information storage; and providing the printer address information extracted from the printer information storage from the server computer to the print client.

* * * * *